US012679479B2

(12) United States Patent (10) Patent No.: US 12,679,479 B2

Scholz (45) Date of Patent: Jul. 14, 2026

(54) SEALING ASSEMBLY FOR VEHICLE

(71) Applicant: MCMURTRY AUTOMOTIVE LIMITED, Wotton-Under-Edge (GB)

(72) Inventor: George Karl Scholz, Wotton-under-Edge (GB)

( * ) Notice: Subject to any disclaimer, the term of this patent is extended or adjusted under 35 U.S.C. 154(b) by 391 days.

(21) Appl. No.: 18/548,529

(22) PCT Filed: Mar. 1, 2022

(86) PCT No.: PCT/EP2022/055077

§ 371 (c)(1),
(2) Date: Aug. 31, 2023

(87) PCT Pub. No.: WO2022/184675

PCT Pub. Date: Sep. 9, 2022

(65) Prior Publication Data

US 2024/0149958 A1 May 9, 2024

(30) Foreign Application Priority Data

Mar. 3, 2021 (GB) ...................................... 2102991

(51) Int. Cl.
B62D 37/02 (2006.01)
B62D 35/02 (2006.01)

(52) U.S. Cl.
CPC .............. B62D 37/02 (2013.01); B62D 35/02 (2013.01)

(58) Field of Classification Search
CPC ......... B62D 37/02; B62D 35/02; B62D 37/00
See application file for complete search history.

(56) References Cited

U.S. PATENT DOCUMENTS 4,386,801 A * 6/1983 Chapman ............... B62D 37/02
296/180.1
8,899,660 B1 * 12/2014 Praskovskaya ...... B62D 35/001
296/180.1

(Continued)

FOREIGN PATENT DOCUMENTS

CA 2715304 A1 * 3/2011 ........... B62D 35/001
DE 3403636 A1 8/1985

(Continued)

OTHER PUBLICATIONS

International Search Report for corresponding PCT/EP2022/055077 dated Jul. 11, 2022.

(Continued)

*Primary Examiner* — Lori Lyjak
(74) *Attorney, Agent, or Firm* — Egbert, McDaniel & Swartz, PLLC

(57) ABSTRACT

Disclosed is a sealing assembly for forming an at least partial seal with a ground surface under a vehicle, the sealing assembly including: a frame; and a plurality of seal elements mounted adjacent to one another on the frame to form a sealing strip, wherein each of the seal elements is arranged to contact and slide along the ground surface; wherein the frame has a greater flexibility compared to each of the seal elements. By forming an at least partial seal with a ground surface under a vehicle, the sealing assembly may reduce air leakage into a low-pressure region formed by a downforce system, which may result in increased downforce produced by the downforce system. Such an increase in downforce may improve the vehicle's grip on the ground surface, which may improve its ability to travel around bends at high speed, as well as its ability to accelerate and decelerate.

31 Claims, 12 Drawing Sheets

(56)                    References Cited

U.S. PATENT DOCUMENTS

| 9,440,689 | B1 * | 9/2016 | Smith | .................... B62D 35/02 |
| 2017/0057565 | A1 * | 3/2017 | Sarhadiangardabad | ..................... B62D 35/02 |

FOREIGN PATENT DOCUMENTS

| DE | 102008019661 | A1 | | 11/2009 | |
| DE | 102010004532 | A1 * | 8/2010 | ............ B62D 35/02 |
| EP | 3533689 | A1 * | 9/2019 | ............ B62D 35/02 |
| FR | 2482548 | A1 * | 11/1981 | ............ B62D 35/02 |
| GB | 2588394 | A | | 4/2021 | |
| GB | 2591050 | A | | 7/2021 | |
| WO | 03070544 | A1 | | 8/2003 | |
| WO | WO-2015143294 | A1 * | 9/2015 | ........... B62D 35/008 |

OTHER PUBLICATIONS

Written Opinion of the International Searching Authority for corresponding PCT/EP2022/055077 dated Jul. 11, 2022.
Written Opinion of the International Preliminary Examining Authority for corresponding PCT/EP2022/055077 dated Sep. 21, 2022.
Search Report for priority application GB 2102991.3 dated Aug. 3, 2021.
Examination Report for priority application GB 2102991.3 dated Dec. 9, 2022.

* cited by examiner

SEALING ASSEMBLY FOR VEHICLE

FIELD OF THE INVENTION

The present invention relates to a sealing assembly for forming an at least partial seal with a ground surface under a vehicle. The sealing assembly may be used as part of a downforce system for a vehicle, which is arranged to generate a downforce acting on the vehicle.

BACKGROUND

One technique for improving a vehicle's grip (or traction) on a ground surface on which it is driving, such as a road, is to generate a downforce which acts on the vehicle and causes the vehicle to be pressed towards the ground surface. Such a downforce may increase tyre adhesion with the ground surface, which may enable the vehicle to travel around bends at greater speeds without losing grip. This may also enable the tyres to transmit greater longitudinal forces to the ground, which may improve acceleration and deceleration of the vehicle.

Typically, a downforce may be generated using aerodynamic characteristics of the vehicle. The vehicle may include one or more surfaces which are configured to generate a downforce when air flows over those surfaces as the vehicle moves. As an example, the vehicle may include an aerofoil (or wing) which is configured to generate a downforce that presses the vehicle towards the ground surface as the vehicle drives over the ground surface. The aerofoil may function based on the same principles as an aircraft wing, except that the aerofoil is arranged to generate a negative lift, i.e. a force directed towards the ground surface.

Another method for generating a downforce that acts on a vehicle is to use a downforce system which is configured to create a low-pressure region underneath the vehicle. For example, the downforce system may include a fan which is arranged to remove air from a region underneath the vehicle, to thereby create a low-pressure region underneath the vehicle. As a result of the low pressure region underneath the vehicle, a downforce may be generated that provides an increased grip of the vehicle on the ground surface.

SUMMARY OF THE INVENTION

At its most general, the present invention provides a sealing assembly for forming an at least partial seal with a ground surface under a vehicle. The sealing assembly may be used as part of a downforce system of a vehicle, in order to form an at least partial seal with the ground surface, e.g. around a low-pressure region formed by the downforce system under the vehicle. The sealing assembly may thus serve to reduce air leakage from the atmosphere into the low-pressure region formed by the downforce system, which may result in an improved performance of the downforce system. In particular, the sealing assembly may enable the downforce system to generate larger downforces, by enabling an increase in a pressure differential between the low-pressure region under the vehicle and the surrounding atmosphere. Such an increase in downforce may improve the vehicle's grip on the ground surface, which may improve its ability to travel around bends at high speed, as well as its ability to accelerate and decelerate.

The sealing assembly of the invention is provided with an enhanced flexibility, to enable it to bend and flex in order to at least partially conform to a shape of the ground surface.

In this manner, as the vehicle travels over the ground surface, the sealing assembly may bend and flex in accordance with the ground surface, whilst maintaining an at least partial seal with the ground surface. Thus, the enhanced flexibility of the sealing assembly may ensure that the at least partial seal with the ground surface is reliably maintained, despite variations (e.g. bumps or uneven areas) in the ground surface. In particular, this may reduce the risk of a sudden decrease in quality of the at least partial seal with the ground surface (e.g. when the vehicle goes over a bump in the ground surface), which could result in a sudden loss of downforce provided by the downforce system. Such a sudden loss of downforce could be highly dangerous in certain situations, as it may result in loss of control of the vehicle.

The enhanced flexibility is achieved by mounting a sealing strip formed of a plurality of seal elements on a frame, with the frame having a greater flexibility compared to each of the seal elements. Thus, the frame may be made of a flexible material which can flex and bend in order to conform to the shape of the ground surface, whilst each of the seal elements may be made of a more rigid material. The more rigid material of the seal elements may serve to withstand abrasion and high temperatures that are caused by a sliding contact between the seal elements and the ground surface as the vehicle travels over the ground surface. As a result, a sealing performance and durability of the sealing strip may be improved. Additionally, making the sealing strip out of a plurality of seal elements, rather than a single piece of rigid material that extends along the whole frame, serves to ensure that the frame is still be able to flex and bend in response to variations in the ground surface.

According to a first aspect of the invention, there is provided a sealing assembly for forming an at least partial seal with a ground surface under a vehicle, the sealing assembly comprising: a frame; and a plurality of seal elements mounted adjacent to one another on the frame to form a sealing strip, wherein each of the plurality of seal elements is arranged to contact the ground surface and slide along the ground surface; wherein the frame has a greater flexibility compared to each of the plurality of seal elements.

The frame may be any suitable support structure on which the plurality of seal elements can be mounted. The frame may include a mounting surface on which the plurality of seal elements is mounted. In some examples, the mounting surface may be a planar (e.g. flat) surface on which the plurality of seal elements is mounted.

The frame may be shaped to define at least part of a perimeter of a region (or area) under the vehicle, e.g. the frame may extend along at least part of the perimeter of the region. In this manner, the sealing strip formed by the plurality of seal elements mounted on the frame may provide an at least partial seal with the ground surface along at least part of the perimeter of the region under the vehicle. As a result, air flow into the region may be restricted by the plurality of seal elements. In some cases, the frame may be shaped to define a perimeter (i.e. the entire perimeter) of a region under the vehicle, e.g. the frame may extend around the entire perimeter of the region. In such a case, the frame may form a closed shape (e.g. a loop), in order to define the perimeter of the region. Then, the sealing strip may extend around the entire perimeter of the region. Where the sealing assembly is used as part of a downforce system, the region may correspond to a region in which a low-pressure is generated by the downforce system.

The frame may be mountable (either directly or indirectly) to an underside of a vehicle. Thus, in use, the frame may be located under the vehicle, and over a ground surface on which the vehicle is disposed. When in use, the mounting surface of the frame may face towards the ground surface, such that the plurality of seal elements mounted thereon may come into contact with the ground surface.

Where the sealing assembly is used as part of a downforce system, the frame may be disposed at a lower end of a skirt of the downforce system, with an upper end of the skirt being mountable to an underside of a vehicle. In other words, the frame may be mounted to the underside of the vehicle via the skirt of the downforce system. In some cases, the frame may be integrally formed as part of a skirt for a downforce system. For instance, a lower end of the skirt may include a mounting surface on which the plurality of seal elements can be mounted, such that the frame may effectively be provided by the lower end of the skirt.

The frame may also be referred to as a rim. For example, the frame may correspond to a rim located at a lower end of a skirt for a downforce system.

The sealing strip is formed by the plurality of seal elements being mounted adjacent to one another on the frame, e.g. on the mounting surface of the frame. In other words, the sealing strip may be a barrier which is formed by the plurality of seal elements mounted on the frame. The plurality of seal elements may be mounted to the frame so as to allow relative motion between adjacent seal elements when the frame is bent (or otherwise deformed).

Each of the plurality of seal elements may be mounted on the frame using any suitable mechanical and/or adhesive means.

In some embodiments, one or more of the plurality of seal elements may be bonded to the frame via an adhesive. Using an adhesive may facilitate mounting the seal elements on the frame, as this may avoid having to drill holes into, or otherwise machine, the seal elements in order to mount them on the frame. Additionally, using an adhesive for bonding a seal element to the frame may be less likely to concentrate stress in the seal element, e.g. in contrast to using mechanical means for securing the seal element on the frame which could result in stress concentrations in the seal element. This may reduce a risk of the seal element cracking or breaking. As an example, a structural epoxy adhesive may be used. The adhesive may be designed to withstand high temperatures. As another example, a double-sided adhesive tape may be used to bond the one or more of the plurality of seal elements to the frame. The inventors have found that a double-sided foam tape (e.g. a double-sided acrylic foam tape) may be particularly effective for bonding a seal element to the frame. Such a double-sided foam tape may comprise a substrate made of a foamed material having adhesive on opposing surfaces of the substrate, and so may be capable of absorbing impacts of the one or more of the plurality of the seal elements against the ground surface, whilst ensuring a strong bond between the seal elements and the frame.

Where the frame defines at least part of a perimeter of a region under the vehicle, the plurality of seal elements may be mounted next to one another along the at least part of the perimeter, so that the sealing strip extends along the at least part of the perimeter.

Each of the plurality of seal elements is arranged to contact the ground surface and slide along the ground surface. In this manner, air flow between the sealing strip and the ground surface may be restricted due to contact of the plurality of seal elements and the ground surface, such that an at least partial seal may be formed between the sealing strip and the ground surface. When the sealing assembly is in use, the frame may be positioned such that the sealing strip engages a ground surface under the vehicle, i.e. such that each of the plurality of seal elements contacts the ground surface, so that an at least partial seal is formed with the ground surface. Then, when the vehicle moves, the plurality of seal elements may slide along the ground surface, so that the at least partial seal with the ground surface is maintained.

Each of the plurality of seal elements may have a ground-engaging surface, which is arranged to contact the ground surface and slide along the ground surface. The ground-engaging surface of a seal element may be a substantially smooth (e.g. planar) surface that is arranged to face towards the ground surface. In this manner, the ground-engaging surface may slide along the ground surface with minimal resistance. Each of the plurality of seal elements may further have a mounting surface, which is mounted against the mounting surface of the frame.

Each of the plurality of seal elements may have any suitable shape. In some cases, the plurality of seal elements may all have a same shape. In other cases, one or more of the plurality of seal elements may have a shape that is different from the other seal elements. More generally, the shapes of the plurality of seal elements may be adapted to a shape of the frame, and the at least part of the perimeter defined by the frame. As an example, the plurality of seal elements may include one or more seal elements in the form of blocks or bricks of material that are mounted next to one another on the frame.

Each of the plurality of seal elements may comprise an abrasion-resistant material. This may reduce the risk of damage to the sealing strip when the seal elements slide along the ground surface (e.g. when the vehicle is moving). In particular, as the seal elements may be made to slide along the ground surface at high speed, the seal elements should preferably be capable of resisting abrasion from the ground surface, as well as be capable of withstanding high temperatures and large forces. Thus, as a result of using an abrasion-resistant material for the plurality of seal elements, an effectiveness and longevity of the sealing strip may be improved. This may also reduce a drag caused by contact between the sealing strip and the ground surface.

The frame has a greater flexibility compared to each of the plurality of seal elements. The greater flexibility of the frame may enable the frame to bend and flex, so that it may at least partially conform to variations (e.g. bumps or uneven areas) in the ground surface. On the other hand, the lower flexibility (i.e. greater rigidity) of the seal elements may improve a quality of the at least partial seal with the ground surface. In particular, by increasing a rigidity of the seal elements, the seal elements may better be able to withstand abrasion from the ground surface as well as large forces that may be exerted on the sealing strip during use. For example, where the sealing assembly is used as part of a downforce system, it may experience a large horizontal force due to drag from the ground surface, as well as a large vertical force (e.g. as the downforce system may press the sealing strip towards the ground surface in order to maintain the at least partial seal). The greater rigidity of the seal elements may improve their ability to withstand such abrasion and forces, thus reducing a risk of failure of the seal elements (e.g. reducing a risk of breaks and/or cracks in the seal elements).

The frame may comprise (e.g. be made of) a material having a greater flexibility compared to a material of the plurality of seal elements. In this manner, the frame may be more easily bent (or otherwise deformed) compared to each of the seal elements. For example, the material of the frame may have a lower Young's modulus compared the material of the seal elements. Additionally or alternatively, the greater flexibility of the frame compared to the seal elements may be achieved by controlling the shapes (e.g. cross-sectional shapes) of the frame and seal elements. For example, a thickness of the frame may be smaller than a thickness of each of the plurality of seal elements.

Preferably, the frame may have a greater flexibility in a direction normal to the ground surface compared to each of the plurality of seal elements. In other words, the frame may be more easily deflected in a direction normal to the ground surface (e.g. in a vertical direction) compared to each of the plurality of seal elements. Thus, the frame may be able to bend towards and/or away from the ground surface, such that the frame can bend in response to variations in the ground surface in order to at least partially conform to the shape of the ground surface.

The frame may be shaped so that its flexibility in the direction normal to the ground surface is enhanced. For example, a thickness of the frame in the direction normal to the ground surface may be smaller than a thickness of the frame in a direction parallel to the ground surface (i.e. in a horizontal direction). As a result, the frame may be more easily bent in the direction normal to the ground surface than in the direction parallel to the ground surface. The thickness of the frame in the direction normal to the ground surface may be smaller than a thickness of each of the plurality of seal elements in the direction normal to the ground surface.

The frame may be made of any suitable material. Preferably, the frame may be made of a lightweight, resilient material. Examples of suitable materials for the frame include aluminium, fibre glass, and/or plastic.

The direction normal to the ground surface may also be referred to (i.e. it may be equivalent to) as a direction normal to a ground-engaging surface of one of the plurality of seal elements, as the ground-engaging surface may be arranged to be substantially parallel to the ground surface.

Advantageously, by forming the sealing strip from a plurality of seal elements, rather than a single large piece of rigid material, flexibility of the sealing assembly may be enhanced. In particular, forming the sealing strip from a plurality of seal elements may enable an amount of relative movement between adjacent seal elements, which enables bending of the frame. As a result, the frame and sealing strip may bend in response to variations in the ground surface, so that the at least partial seal with the ground surface may effectively be maintained. The enhanced flexibility of the sealing assembly may reduce a risk of the sealing strip being deflected away from the ground surface when the vehicle goes over a variation (e.g. a bump) in the ground surface, as the sealing assembly may be able to conform to the variation in the ground surface. This may reduce a risk of a sudden loss of the at least partial seal with the ground surface. For instance, where the sealing assembly is used as part of a downforce system, a sudden loss of the at least partial seal with the ground surface could result in a sudden loss of downforce, which could result in loss of control of the vehicle. Thus, the sealing assembly of the invention provides the benefits of using rigid seal elements, whilst still enabling the frame to bend and flex in response to variations in the ground surface.

Forming the sealing strip from a plurality of seal elements may provide further benefits in terms of maintenance of sealing assembly. In particular, this may enable individual seal elements to be replaced or repaired, without having to replace or repair the entire sealing strip. This may facilitate maintenance of the sealing assembly.

The plurality of seal elements may be arranged such that a gap is formed between at least one pair of adjacent seal elements. Forming a gap between adjacent seal elements may facilitate relative movement between the adjacent seal elements during bending of the frame. This may facilitate bending of the frame in the vicinity of the gap between the adjacent seal elements, such that a flexibility of the sealing assembly may be improved. Therefore, an ability of the frame to bend or flex in response to variations in the ground surface may be improved, which may in turn improve a reliability with which the at least partial seal with the ground surface can be maintained. In some cases, respective gaps may be formed between multiple pairs of adjacent seal elements. In further cases, a respective gap may be formed between each pair adjacent seal elements, which may improve an overall flexibility of the sealing assembly.

As an example, the gap between the adjacent seal elements may have a width between about 0.5 mm and 5 mm. In other words, a distance separating the adjacent seal elements may be between about 0.5 mm and 5 mm. A gap of this size may enable relative movement between the adjacent seal elements when the frame bends, whilst still restricting air flow through the sealing strip. Where a respective gap is formed between each pair adjacent seal elements, each gap may have a width between about 0.5 mm and 5 mm.

The gap formed between the at least one pair of adjacent seal elements may be filled with a material having a higher flexibility than a material of the plurality of seal elements. In this manner, air flow through the gap may be blocked or restricted by the material filling the gap, which may minimise air leakage through the sealing strip. The higher flexibility of the material filling the gap compared to the material of the seal elements may enable relative movement between the adjacent seal elements, thus facilitating bending of the frame in the vicinity of the gap. For example, the material filling the gap may be arranged to be compressed and/or stretched between adjacent seal elements when the frame is bent in the vicinity of the gap. Preferably, the material filling the gap may be chosen so that it offers little or no resistance to relative movement between the adjacent seal elements. In some cases, a flexibility of the material filling the gap may be greater than a flexibility of the material of the frame, to further enhance flexibility of the sealing assembly. As an example, a suitable material for filling the gap may comprise silicone, sealant or liquid gasket. The material filling the gap may be designed to withstand high temperatures. Advantageously, the inventors have found that where a silicone material (e.g. silicone sealant) is used to fill the gap, the silicone material may serve to absorb impacts from small stones or other features on the ground surface, thus protecting the seal elements.

Of course, where gaps are formed between multiple pairs of adjacent seal elements, each gap may be similarly filled with a flexible material.

At least one of the plurality of seal elements may comprise a ground-engaging surface configured to contact the ground surface, wherein one or more edges of the ground-engaging surface are rounded, chamfered or bevelled. Chamfering or bevelling edges of the ground-engaging surface may avoid the presence of sharp edges on the ground-engaging surface, which may be fragile and prone to breaking when the ground-engaging surface slides along the ground surface. Thus, a durability of the seal element may be improved. Additionally or alternatively, edges of the ground-engaging surface may be rounded, in order to improve a durability of the seal element. Such chamfering, bevelling and/or rounding of the edges may be applied to the ground-engaging surfaces of each of the plurality of seal elements.

One or more of the plurality of seal elements may be removably mounted to the frame. In this manner, the one or more of the plurality of seal elements can be individually mounted to, and removed from, the frame. This may facilitate maintaining and repairing the sealing strip, as each of the one or more of the plurality of seal elements may be removed from the frame for maintenance or replacement. For instance, if a seal element breaks or is damaged, it may be replaced without having to replace the entire sealing strip, which may greatly reduce a cost of the repair. Each of the one or more of the plurality of seal elements may be removably mounted to the frame via any suitable mechanism for releasably mounting the seal elements to the frame. In some cases, each of the plurality of seal elements may be removably mounted to the frame.

Each of the one or more of the plurality of seal elements may be removably mounted to the frame by a respective fastener that is received in a hole in the seal element. This may enable each of the one or more of the plurality of seal elements to be securely mounted to the frame, whilst facilitating their removal from the frame. Mechanically securing a seal element to the frame with a fastener may also improve a reliability with which the seal element is mounted on the frame. As an example, the hole in the seal element may be a through-hole, and the respective fastener may comprise a bolt that passes through the through-hole to secure the seal element to the frame.

The hole may be countersunk or counterbored, such that a head of the fastener may be recessed into the seal element. This may serve to protect the fastener, which may typically be more vulnerable to abrasion from the ground surface than the seal element. For example, where the fastener comprises a bolt passing through a through-hole in the seal element, a head of the bolt may be recessed into the seal element due to the hole being countersunk or counterbored.

Alternatively, the hole in the seal element may be a threaded blind hole, and the respective fastener may comprise a screw or similar that is engaged in the threaded hole to secure the seal element to the frame. In other words, the hole in the seal element need not necessarily be a through-hole that passes all the way through the seal element. A blind hole in a seal element may be provided with a thread by a separate threaded component that may be inserted into the blind hole. Thus, a screw or similar may hold the seal element in place by engaging with the thread provided by the separate threaded component. For example, a steel threaded insert may be bonded into a blind hole in a seal element using an appropriate adhesive.

In some embodiments, the sealing assembly may further comprise one or more retaining elements for removably mounting the one or more of the plurality of seal elements to the frame, wherein each retaining element is releasably engageable with a surface of a seal element to hold the seal element against the frame. In other words, when a retaining element is engaged with a surface of a seal element, it may exert a retaining force on the seal element which holds the seal element in place against the frame. For example, the one or more retaining elements may be arranged to clamp, wedge, or otherwise hold the one or more of the plurality of seal elements against the frame. As a result, the one or more of the plurality of seal elements may be mounted on the frame without having to make any holes in the seal elements, which may improve an integrity and durability of the seal elements. This may also facilitate mounting the one or more of the plurality of seal elements on the frame and removing them from the frame. Indeed, to mount the one or more of the plurality of seal elements on the frame, the one or more retaining elements may be engaged with corresponding surfaces on the one or more of the plurality of seal elements. To remove the one or more of the plurality of seal elements from the frame, the one or more retaining elements may be disengaged from the corresponding surfaces on the one or more of the plurality of seal elements.

The surface of a seal element that is engageable by one of the retaining elements may be an outer surface of the seal element, e.g. a side surface of the seal element. Each of the retaining elements may have an engagement surface that is arranged to engage a corresponding surface on a seal element, in order to exert a retaining force of the seal element to thereby hold it against the frame. The engagement surface may have a shape that is complementary to a shape of the surface on the seal element.

Each of the one or more retaining elements may be removably mounted to the frame. In this manner, the one or more retaining elements may be mounted to the frame in order hold the one or more of the plurality of seal elements against the frame. Then, the one or more retaining elements may be removed from the frame, in order to release the one or more of the plurality of seal elements from the frame. Each of the one or more retaining elements may be removably mounted to the frame via any suitable fastener, such as a bolt or screw. Thus, a fastener such as a bolt or screw may be used in mounting a seal element to the frame, without the fastener causing stress concentrations in the seal element. In some cases, the one or more retaining elements may be removably mounted to the mounting surface of the frame, e.g. a same surface on which the plurality of seal elements is mounted.

Each of the one or more retaining elements may be arranged to engage respective surfaces on two or more adjacent seal elements. As a result, each of the one or more retaining elements may overlap any gaps between the two or more adjacent seal elements whose respective surfaces it is arranged to engage. Thus, the retaining element may restrict or block air flow between the two or more adjacent seal elements, which may serve to reduce an air leakage through the sealing strip. As a result, a quality of the at least partial seal with the ground surface may be improved.

The one or more retaining elements may comprise a first set of retaining elements and a second set of retaining elements which are arranged to engage surfaces on opposite sides of the one or more of the plurality of seal elements, such that the one or more of the plurality of seal elements are held between the first set of retaining elements and the second set of retaining elements. In this manner, the one or more of the plurality of seal elements may be engaged on opposite sides by the one or more retaining elements, which may ensure that they are securely held in place and mounted to the frame. For example, the first and second set of retaining elements may be arranged to clamp or wedge the one or more of the plurality of seal elements between them.

The one or more retaining elements may be made of a different material compared to the plurality of seal elements. For example, the one or more retaining elements may be made of a more lightweight (e.g. lower density) and/or flexible material compared to the plurality of seal elements. This may serve to minimise a mass of the sealing assembly, as well as ensure that the one or more retaining elements do not significantly inhibit bending or flexing of the rim. This may also facilitate manufacture of the retaining elements, as the material of the retaining elements may be chosen so that retaining elements of a desired shape can easily be produced. For example, the one or more retaining elements may be made of materials such as aluminium, fibre glass, or plastic.

In some embodiments, the sealing assembly may further comprise one or more holder elements for removably mounting the one or more of the plurality of seal elements to the frame, wherein each holder element may be mounted to the frame and defines a channel in which at least one of the one or more of the plurality of seal elements is received, the holder element being configured to engage an outer surface of the seal element to hold the seal element in the channel. Such a holder element may facilitate mounting the seal elements to the frame, as a seal element may be held in place by virtue of the shape of the holder element. For example, a seal element may be inserted into the channel of a holder element, where it may then be held in place due to engagement between the holder element and its outer surface. In other words, the seal element may be held in the channel due to friction between the outer surface of the seal element and the holder element. The channel may extend along a portion of the sealing strip.

Each holder element may comprise an engagement portion which is configured to engage the outer surface of the seal element. The engagement portion may also serve to define part of the channel in which the seal element is received. The channel in each holder element may have a shape that is complementary to a shape of the outer surface of the seal element. For example, the holder element may be shaped such that an interference fit is formed between the holder element and the seal element in its channel. In this manner, the seal element may be securely held within the channel.

Each holder element may be removably mounted to the frame (e.g. to a mounting surface of the frame) via one or more releasable fasteners, such as bolts or screws. Alternatively, each holder element may be bonded to the frame, using a suitable adhesive. As an example, the one or more holder elements may be mounted to the frame via a double-sided adhesive tape, e.g. a double-sided foam tape such as double-sided acrylic foam tape. A double-sided foam tape may enable impacts of the seal elements with the ground surface to be absorbed, whilst ensuring a strong bond between the holder elements and the frame. As another example, a structural epoxy adhesive may be used to secure the one or more holder elements to the frame.

In some cases, each of the one or more holder elements may comprise a heat dissipation structure. For example, such a heat dissipation structure may comprise one or more fins or pins provided on an outer surface of a holder element. This may enable a holder element to dissipate heat from a seal element located in its channel, e.g. where the heat may be generated by friction between the seal elements and the ground surface. As a result, a temperature of the seal elements may be reduced, which may improve a performance and durability of the seal elements.

Various different materials may be used for the holder elements. As an example, the one or more holder elements may comprise a plastic material. This may provide the holder elements with beneficial compliance and shock absorption qualities. Additionally or alternatively, the one or more holder elements may comprise a metallic material (e.g. aluminium or steel). Use of a metallic material in the holder elements may improve thermal conduction between a holder element and a seal element held in its channel, thus facilitating dissipation of heat from the seal element.

In some embodiments, the sealing assembly may further comprise an intermediate material disposed between the frame and each of the one or more of the plurality of seal elements, wherein the intermediate material is removably mounted to the frame and the one or more of the plurality of seal elements are secured to the intermediate material. In this manner, the one or more of the plurality of seal elements may be mounted to the frame via the intermediate material. This may avoid having to apply fasteners (e.g. bolts or screws) directly to the one or more of the plurality of seal elements, as these can be applied to the intermediate material instead. Thus, it may not be necessary to form any holes in the one or more of the plurality of seal elements, which may improve an integrity and durability of the seal elements. The intermediate material may comprise any suitable material. Preferably, the intermediate material may comprise a material that is more lightweight (e.g. it has a lower density) than the material of the seal elements, and that has a higher flexibility than the material of the seal elements. As an example, the intermediate material may comprise aluminium (e.g. an aluminium plate), however other materials may also be used, such as plastic or fibre glass.

The intermediate material may be removably mounted to the frame (e.g. to a mounting surface of the frame) via one or more releasable fasteners, such as bolts or screws. In one example, one or more holes may be formed in the intermediate material, in which one or more fasteners are engaged in order to secure the intermediate material to the frame.

The intermediate material may comprise a plurality of respective intermediate elements disposed between the frame and each one or more of the plurality of seal elements. In other words, an individual intermediate element may be disposed between each of the one or more of the plurality of seal elements and the frame (e.g. rather than a single piece of intermediate material that extends between the frame and all of the one or more of the plurality of seal elements). This may serve to improve a flexibility of the sealing assembly by enabling relative movement between adjacent intermediate elements when the frame bends.

The one or more of the plurality of seal elements may be secured to the intermediate material via an adhesive. As noted above, a benefit of using an adhesive when securing a seal element to the frame is that this may avoid any concentration of stress in the seal element. Furthermore, this may avoid having to make any holes in the seal element, which may improve an integrity and durability of the seal element. However, where the seal element is directly bonded to the frame via an adhesive, this may make the seal element difficult to remove from the frame, depending on the type of adhesive used. By instead bonding the seal element to the intermediate material with an adhesive, the benefits of using an adhesive for securing the seal element may be enjoyed, whilst facilitating removal of the seal element from the frame (e.g. by dismounting the intermediate material from the frame). As an example, the one or more of the plurality of seal elements may be secured to the intermediate material via a double-sided adhesive tape, e.g. a double-sided foam tape such as double-sided acrylic foam tape. A double-sided foam tape may enable impacts of the seal elements with the ground surface to be absorbed, whilst ensuring a strong bond between the seal elements and the intermediate material. As another example, a structural epoxy adhesive may be used to secure the one or more of the plurality of seal elements to the intermediate material.

One or more voids or cavities may be formed in the intermediate material. This may serve to reduce a mass of the intermediate material, as well as increase a flexibility of the intermediate material. As a result, the sealing assembly may be lighter and more flexible. The voids or cavities may correspond to regions of the intermediate material having a reduced thickness. The voids or cavities may be formed away from potential stress points in the intermediate material. For example, where one or more holes are formed in the intermediate material for mounting it to the frame, the voids or cavities may be formed away from the one or more holes. Thus, a region of the intermediate material around the one or more holes may have a greater thickness compared to a region of the intermediate material away from the one or more holes.

A surface of the intermediate material to which the one or more of the plurality of seal elements may be secured may comprise one or more engagement features which are engaged with corresponding engagement features on the one or more of the plurality of seal elements. Engagement between the engagement features on the one or more of the plurality of seal elements and the engagement features on the intermediate material may serve to strengthen the connection between the seal elements and the intermediate material. For instance, this may reduce a risk of slippage between the seal elements and the intermediate material, and/or a risk of the seal elements falling off the intermediate material. The engagement features on the seal elements and the intermediate material may also serve to ensure accurate positioning of the seal elements on the intermediate material. Where one or more voids or cavities are formed in the intermediate material, the one or more engagement features on the intermediate material may be formed by surfaces of the one or more voids or cavities.

In some cases, the sealing assembly may further comprise a padding material, the padding material having a greater flexibility than the frame and each of the plurality of seal elements, the padding material being arranged to deform (e.g. be compressed and/or stretched) in response to an impact between the ground surface and one or more of the plurality of seal elements. This may enable a small amount of relative movement between the one or more of the plurality of seal elements and the frame. In this manner, the padding material may serve to dissipate energy from an impact between a seal element and the ground surface, which may reduce a risk of the seal element breaking. The padding material may be made of any suitable compressible (e.g. elastic, resilient) material, such as rubber or a foamed material.

As an example, where a seal element comprises a through-hole and a bolt passes through the through-hole to secure the seal element to the frame, the padding material may be disposed within the through-hole, the padding material being arranged such that it is between a shaft of the bolt and the seal element. For example, the padding material may form a sleeve around the shaft of the bolt within the through-hole. Additionally or alternatively, the padding material may be disposed in a countersunk or counterbored portion of the through-hole, such that it is disposed around a head of the bolt. As another example, the padding material may be disposed between one or more of the plurality of seal elements and the frame. As a further example, where a seal element is secured to the frame via a fastener (e.g. bolt or screw) that passes through a through-hole in the frame, the padding material may be disposed in the through-hole in the frame such that it is between a shaft of the fastener and the frame, e.g. the padding material may form a sleeve around the shaft of the fastener within the through-hole in the frame.

The plurality of seal elements may comprise a ceramic material, a composite ceramic material, and/or a carbide material. Such materials may be highly heat resistant, have high strength and hardness, as well as good wear resistance (e.g. abrasion resistance) and a high load bearing capacity. Accordingly, these materials may be well suited for making seal elements for use in the seal assembly of the invention, as they may be capable of withstanding the large forces and high temperatures that may occur during sliding contact between the seal elements and the ground surface. However, other materials having suitable properties (e.g. high heat resistance, load bearing capacity and abrasion resistance) may also be used for the seal elements.

An example of a suitable ceramic material for making the seal elements includes zirconia ($ZrO_2$). Advantageously, zirconia is a relatively lightweight material, such that making the seal elements with zirconia may serve to minimise a mass of the sealing assembly.

A composite ceramic may include a material embedded in a ceramic matrix. As an example, a composite ceramic comprising alumina ($Al_2O_3$) platelets embedded in a zirconia matrix may be suitable for making the seal elements. This composite ceramic has a high hardness and resistance to fractures, as well as a high heat resistance. Accordingly, seal elements made from this material may have a good durability and reliability. Such a composite ceramic is supplied, for example, by Precision Ceramics under the name CeramaZirc™.

A composite ceramic may include a ceramic matrix composite (CMC), which is a material comprising fibres embedded in a ceramic matrix. Such materials may have high toughness and resistance to cracking, as well as a high heat resistance. An example of a suitable CMC for making the seal elements may include carbon fibre reinforced silicon carbide (C/SiC).

An example of a suitable carbide material for making the seal elements includes tungsten carbide (WC). Advantageously, tungsten carbide may provide a high resistance to impacts, such that a seal element made of tungsten carbide may be less likely to crack or break following a large impact (e.g. with a bump in the ground surface).

One or more of the plurality of seal elements may be coated with an abrasion resistant material. This may improve durability of the seal elements, by reducing abrasion of the seal elements caused by the ground surface. This may also reduce a drag of the seal elements on the ground surface. An example of a suitable material for coating the seal elements includes titanium nitride (TiN).

In some cases, one or more of the seal elements may comprise a body made of steel (e.g. hardened steel) and having an outer coating made of an abrasion resistant material (e.g. TiN). Advantageously, steel may be able to withstand large loading forces and impacts without breaking, thus improving a reliability and durability of the seal elements.

The plurality of seal elements may comprise one or more seal elements having a substantially rectangular cross-section in a plane parallel to the ground surface. In other words, a cross-section of the one or more seal elements in a horizontal plane may be substantially rectangular. This may facilitate mounting the one or more seal elements adjacent to one another on the frame. This may also serve to minimise an air leakage through the sealing strip, as the one or more seal elements may be arranged such any gaps between them are in the form of long narrow channels that restrict air flow therethrough.

At least one of the plurality of seal elements may comprise a portion that overlaps a corresponding portion of an adjacent seal element. In other words, at least two of the plurality of seal elements may have interlocking shapes. Such overlapping or interlocking shapes of adjacent seal elements may serve to increase a length of any gap between the adjacent seal elements, such that air leakage between the adjacent seal elements may be minimised. As a result, a quality of the at least partial seal with the ground surface may be improved. As an example, a first seal element of the plurality of seal elements may comprise a first portion that extends in a direction along the sealing strip, and a second seal element of the plurality of seal elements may comprise a second portion that extends in an opposite direction along the sealing strip, the second seal element being adjacent to the first seal element, wherein the first portion and the second portion overlap along the sealing strip. In this manner, in order to pass between the first and second seal elements, air must pass between the first and second portions, such that a length of an air flow path between the first and second seals may be increased. The first and second portions may be arranged such that a gap between the first and second seal elements is non-linear (i.e. it includes one or more bends or corners), in order to increase the length of the air flow path. In some cases, the plurality of seal elements may be arranged such that each pair of adjacent seal elements overlaps or interlocks, in order to minimise air leakage through the sealing strip.

The sealing assembly may further comprise a blocking element extending between a first one of the plurality of seal elements and a second, adjacent, one of the plurality of seal elements, the blocking element being arranged to restrict an air flow between the first and second ones of the plurality of seal elements. Thus, any gap between the first and second seal elements may be at least partially blocked by the blocking element, such that air leakage between the first and second seal elements may be minimised. The blocking element may comprise a material having a greater flexibility than the seal elements. In this manner, the blocking element may allow an amount of relative motion between the first and second seal elements. The blocking element may be secured or otherwise held between the first and second seal elements. As an example, the blocking element may comprise a first portion which is received in a first receiving portion (e.g. slot) in the first seal element, and a second portion which is received in a second receiving portion (e.g. slot) in the second seal element, such that the blocking element extends between the first and second seal elements. In some cases, the sealing assembly may comprise a respective blocking element that extends between each pair of adjacent seal elements, so as to restrict an air flow between each pair of adjacent seal elements.

The plurality of seal elements may comprise one or more seal elements, each of which has an inner side arranged to face towards an inside of the at least partial seal with the ground surface, and an outer side arranged to face towards an outside of the at least partial seal with the ground surface, the inner side of the seal element being shorter than the outer side of the seal element. Making the inner side shorter than the outer side may facilitate arranging the one or more seal elements in a curved shape, whilst minimising any gaps therebetween. This may thus facilitate providing a sealing strip having a curved shape. For example, in a curved region of the sealing strip, the one or more seal elements may be mounted on the frame adjacent to one another such that their outer sides are arranged on the outside of the curve, and such that their inner sides are arranged on the inside of the curve. The inner side and the outer side may be substantially parallel to one another. Thus, the sealing strip may have a curved shape, without having provide the seal elements themselves with a curved shape, which may facilitate manufacture of the seal elements.

The plurality of seal elements may comprise a first seal element arranged at a front end of the sealing strip, the first seal element comprising a pointed or curved tip facing in a forward direction of the sealing strip. Such a pointed or curved tip of the seal element arranged at the front end of the sealing strip may make the sealing assembly more aerodynamic, thus reducing an aerodynamic drag produced by the sealing assembly. The front end of the sealing strip may correspond to an end of the sealing strip that is arranged towards a front end of the vehicle, when the sealing assembly is mounted under a vehicle (e.g. as part of a downforce system). The forward direction may correspond to a direction of forward travel of the vehicle.

The plurality of seal elements may comprise a second seal element arranged at a rear end of the sealing strip, the second seal element comprising a pointed or curved tip facing a rearwards direction of the sealing strip. Such a pointed or curved tip of the seal element arranged at the rear end of the sealing strip may make the sealing assembly more aerodynamic, thus reducing an aerodynamic drag produced by the sealing assembly. The rear end of the sealing strip may correspond to an end of the sealing strip that is arranged towards a rear end of the vehicle, when the sealing assembly is mounted under a vehicle (e.g. as part of a downforce system). The rearwards direction may correspond to a direction opposite a direction of forward travel of the vehicle.

The sealing strip may form a closed shape. In this manner, the sealing strip may be arranged around a perimeter of a region under the vehicle, such that the at least partial seal with the ground surface may restrict air flow into the region. For example, where the sealing assembly is used as part of a downforce system, the sealing strip may extend around a perimeter of a low pressure region under the vehicle, to thereby restrict air leakage into the low pressure region. The sealing strip may be in the form of a loop, or any other suitable closed shape. For example, the sealing strip may form an oval or a pointed oval (e.g. an oval whose ends are pointed). An oval shape of the sealing strip may improve an aerodynamic profile of the sealing assembly, thus reducing an aerodynamic drag produced by the sealing assembly. The shape of the frame may be adapted to the shape of the sealing strip. So, where the sealing strip forms a closed shape, the frame may also form a corresponding closed shape.

The sealing assembly may further comprise an outer sealing strip which is mounted on the frame, and arranged on an outer side of the sealing strip formed by the plurality of seal elements. The outer sealing strip may serve to further improve a quality of the at least partial seal with the ground surface. In particular, the outer sealing strip and the sealing strip formed by the plurality of seal elements may act as a double-barrier, with the outer sealing strip acting to reduce air leakage through the plurality of seal elements. The outer sealing strip may extend along at least part of a length of the sealing strip formed by the plurality of seal elements. Where the sealing strip forms a closed shape, the outer sealing strip may form a closed shape which is arranged concentrically around the sealing strip. Alternatively, the outer sealing strip may extend along one or more sections of the sealing strip formed by the plurality of seal elements. The sealing assembly may comprise multiple outer sealing strips to further improve the quality of the at least partial seal with the ground surface. For example the sealing assembly may comprise a first outer sealing strip which is arranged to form a closed shape around the sealing strip formed by the plurality of seal elements, and a second outer sealing strip that extends around one or more sections of the first outer sealing strip, for example flanking the first outer sealing strip. The outer sealing strip being located on an outer side of the sealing strip formed by the plurality of seal elements may mean that the outer sealing strip is arranged to be towards an outer side of the at least partial seal with the ground surface, and the sealing strip formed by the plurality of seal elements is arranged to be towards an inner side of the at least partial seal.

A cavity may be defined between the outer sealing strip and the sealing strip formed by the plurality of seal elements. The cavity may provide a chamber of turbulent air between the outer sealing strip and the sealing strip formed by the plurality of seal elements. The presence of turbulent air in the cavity may further improve a quality of the at least partial seal with the ground surface. In particular, the turbulent air in the cavity may be less likely to leak past the seal elements, and may provide a barrier to air flow between the outer sealing strip and the sealing strip formed by the plurality of seal elements. Where multiple outer sealing strips are used, each outer sealing strip may be associated with a separate cavity. The multiple outer sealing strips may be spaced outwards (e.g. laterally) from the sealing strip formed by the plurality of seal elements. In this manner, a cavity may be formed between the sealing strip formed by the plurality of seal elements and a first one of the outer sealing strips, and a respective cavity may be defined between pairs of adjacent outer sealing strips. For example, in the case where there is a first outer sealing strip and a second outer sealing strip, a first cavity may be defined between the first outer sealing strip and the sealing strip formed by the plurality of seal elements, and a second cavity may be defined between the first outer sealing strip and the second outer sealing strip.

Air in the cavity may become turbulent due to features of the sealing strip, the outer sealing strip, the ground surface and/or the cavity, for example turbulence generating features. In other words, the sealing strip and the outer sealing strip may be configured to encourage the air in the cavity to become and/or remain turbulent. For example, the shape, size, materials and/or surface finish of the sealing strip and/or the outer sealing strip may be selected to encourage turbulence in the air in the cavity. Additionally or alternatively, dedicated turbulence generating features may be provided to generate turbulence in the cavity. For example, turbulence may be increased through the use of turbulators which may resemble twists, spirals or coils of sheet material or wire located in the cavity, adhesive tapes or surface coatings that may be applied to surfaces inside the cavity, and/or baffles that create partial blockages within the cavity. Other turbulence generating features may also be used.

Additionally or alternatively, turbulence may be generated in the cavity though the introduction to the cavity of a controlled leakage of air via at least one controlled leakage path. A controlled leakage path may comprise a hole or slot that is formed in either the sealing strip formed by the plurality of seal elements or in the outer sealing strip, and may provide an air flow path linked to the cavity to create turbulence in the cavity. For example, the hole or slot may be formed in one or more of the plurality of seal elements or between adjacent seal elements to provide a controlled leakage path to the air in the cavity. Air may flow along this path from the cavity through the seal elements which may evacuate air from the cavity. This evacuation of air from the cavity may generate turbulence in the cavity. Additionally or alternatively, a controlled leakage path may be provided by a calibrated gap formed in either the sealing strip formed by the plurality of seal elements or outer sealing strip. For example, a gap may be provided in the outer sealing strip where a section of the outer sealing strip is not fitted to the sealing assembly or where a section of the outer sealing strip is modified to provide at least one calibrated gap, for example through a localised reduction in a height of the outer sealing strip. Air may flow through such a gap into the cavity which may introduce air into the cavity. This increase in air in the cavity may generate turbulence in the cavity. In other words, either the sealing strip formed by the plurality of seal elements or the outer sealing strip may be configured to provide at least one controlled leakage path in the form of a hole, slot or gap which may provide a controlled leakage of air to the cavity to generate turbulence in the cavity. In this manner turbulence may be generated or increased in the cavity.

The outer sealing strip may have a similar configuration to the sealing strip formed by the plurality of seal elements. For example, the outer sealing strip may be formed by a plurality of outer seal elements that are mounted on the frame. The outer seal elements may be mounted on the frame in any of the ways discussed above in relation to the plurality of seal elements. Alternatively, the outer sealing strip may be formed by a single strip of material which is bonded or otherwise mounted to the frame.

The outer sealing strip may be integrally formed as part of the sealing strip formed by the plurality of seal elements. In other words, the sealing strip formed by the plurality of seal elements may comprise an outer portion that serves to further improve the quality of the at least partial seal with the ground surface. The outer portion may comprise a plurality of outer portions that are each integrally formed with one the plurality of seal elements that form the sealing strip. In this way each seal element may comprise an outer portion which may be one part with the seal element. For example, at least one of the plurality of seal elements may comprise an outer portion, e.g. an outer ground-engaging surface, that serves to further reduce leakage through the plurality of seal elements by providing at least part of an outer sealing strip and a cavity on an inside of the at least part of an outer sealing strip. Such a seal element comprising an outer portion may act as a double barrier. A sealing strip formed by a plurality of such seal elements may comprise an integrally formed outer sealing strip by default.

The sealing strip of the first aspect of the invention may be used as part of a skirt for a downforce system. Thus, according to a second aspect of the invention, there is provided a skirt for a downforce system of a vehicle, the skirt comprising: a divider connected at an upper end to an upper surface of the skirt, the divider being arranged to extend downwards from the upper surface to thereby define at least in part a region over a ground surface on which the vehicle is disposed; and a sealing assembly according to the first aspect of the invention, wherein the frame extends along a lower end of the divider such that the sealing strip is arranged to form an at least partial seal with the ground surface. Any of the features discussed in relation to the sealing assembly of the first aspect of the invention may be shared with the second aspect of the invention.

The upper surface of the skirt may be configured to be mounted to an underside of the vehicle. For example, the upper surface of the skirt may comprise a plate that is mountable to an underside of the vehicle. However, in some cases, the upper surface of the skirt may comprise part of an underside of the vehicle itself.

The divider may be any suitable part that extends downwards from the upper surface of the skirt in order to at least partially define a region over the ground surface on which the vehicle is disposed. In other words, the divider may be disposed around (e.g. partially enclose) a region over the ground surface under the vehicle. The region may correspond to a region in which a low pressure is generated by the downforce system.

The sealing assembly is disposed at the lower end of the divider, such that the sealing strip can form an at least partial seal with the ground surface, i.e. so that the plurality of seal elements contact the ground surface and can slide along the ground surface. In this manner, the sealing strip may extend along at least part of a perimeter of the region which is at least partially defined by the divider. Thus, the divider and the sealing assembly may together restrict air flow into the region under the vehicle.

The divider may include a flexible material, in order to allow relative movement between the frame and the upper surface of the skirt, e.g. in response to variations in the ground surface. For example, the divider may be in the form of bellows. The divider may comprise a textile or some other suitable flexible material. Alternatively, the divider may comprise a telescopic coupling, e.g. made of two or more telescopic sections, e.g. concentric sections, which are movable relative to one another.

In use, the skirt may be disposed over the ground surface on which the vehicle is disposed, such that together the upper surface of the skirt, divider, sealing assembly and the ground surface define a region or volume. In other words, the skirt may at least partially enclose the region over the ground surface. The region may be partially enclosed, as in some cases the skirt may be open at one end. In other words, the skirt need not necessarily surround the entire region. The region may be located on an inside of the divider, whilst an outside of the divider may face outwards, e.g. the outside of the divider may be in contact with the atmosphere outside the vehicle.

Once the skirt is in place over the ground surface, the downforce system may generate a low pressure in the region under the vehicle, e.g. by evacuating air from the region. The low pressure inside the region under the vehicle may result in a pressure differential being generated across the divider (due to the low pressure on the inside of the divider and the atmospheric pressure on the outside of the divider). As a result of the pressure differential, a downforce is generated which acts on the vehicle.

The frame may be movable relative to the upper surface between a deployed position where the plurality of seal elements are arranged to contact the ground surface, and a stowed position where the plurality of seal elements are spaced apart from the ground surface. Thus, when the skirt is not in use (e.g. when the downforce system is inactive), the frame may be place in the stowed position. This may avoid damage to the sealing assembly as well as the rest of the skirt when not in use. When the frame is in the stowed position, it may be located at substantially a same height above the ground surface as the underside of the vehicle. For example, when the frame is in the stowed position, part or all of the skirt may be disposed in a cavity or storage compartment in an underside of the vehicle.

The skirt may comprise an actuator for moving the frame between the deployed position and the stowed position. For example, the actuator may be connected between the upper surface of the skirt and the frame, and arranged to move the frame between the deployed and stowed positions.

The skirt may be configured to apply a force to the frame to press the sealing strip against the ground surface. Pressing the sealing strip against the ground surface may serve to enhance a quality of the at least partial seal with the ground surface. This may also serve to ensure that the sealing strip remains in contact with the ground surface even when it receives an impulse (e.g. due to a bump in the ground surface), which might otherwise cause part of the sealing strip to lift off the ground surface. The skirt may include any suitable mechanism for applying a force to the frame. For example, the skirt may comprise a biasing element (e.g. a spring) which is mounted between the upper surface of the skirt and the frame, and arranged to apply a force to the frame to press the sealing strip against the ground surface. As another example, the skirt may comprise an actuator arranged to apply the force to the frame. Use of an actuator for this purpose may enable the force applied to the rim to be varied, which may enable a strength of the at least partial seal to be varied. For instance, the actuator mentioned above for moving the frame between the stowed and deployed positions may also be configured to apply a force to the frame to press the sealing strip against the ground surface.

According to a third aspect of the invention, there is provided a downforce system for a vehicle, the downforce system comprising: a skirt according to the second aspect of the invention, and a pressure source configured to generate a pressure differential across the divider. Any features discussed in relation to the first and second aspects of the invention may be included in the downforce system of the third aspect of the invention.

Thus, as discussed above, when the skirt is arranged over a ground surface under a vehicle, the sealing strip may contact the ground surface to form an at least partial seal with the ground surface. Then the pressure source may evacuate air from the region defined inside the divider, such that a pressure differential may be generated across the divider. As a result, a downforce acting on the vehicle may be generated.

The pressure source may include any suitable apparatus for evacuating air from the region under the vehicle. For example, the pressure source may include a fan or similar. The skirt may comprise an air outlet (e.g. formed in the upper surface of the skirt), through which air in the region under the vehicle may be evacuated. Then, the pressure source may be configured to cause air to flow out through the air outlet.

The downforce system may comprise a controller which is configured to control various aspects of the downforce system. For example, the controller may be configured to control any actuators of the skirt (e.g. to control a position of the rim and a force applied to the rim), as well as the pressure source. The controller may comprise any suitable computing device which is communicatively coupled to pressure source and any actuators of the skirt, so that the controller may transmit control signals to the pressure source and actuators.

According to a fourth aspect of the invention, there is provided a vehicle comprising a downforce system according to the third aspect of the invention. The vehicle may comprise any of the features discussed in relation to the previous aspects of the invention.

The vehicle may be any type of vehicle such as a road car or race car. The vehicle may be an electric vehicle, a hybrid vehicle, a vehicle with an internal combustion engine, a fuel-cell-powered vehicle, or any other type of powered vehicle.

The skirt may be disposed on an underside of the vehicle, e.g. the upper surface of the skirt may be mounted to the underside of the vehicle and/or the upper surface of the skirt may comprise part of the underside of the vehicle. In this manner, the skirt may serve to define a region over the ground surface directly underneath the vehicle. The skirt may be centred relative to the underside of the vehicle, e.g. a centre of the skirt may be aligned with a centre of the underside of the vehicle. This may serve to ensure that the downforce generated by the system acts substantially evenly on the vehicle.

It should be noted that, although the sealing assembly of the invention is discussed above as being used as part of a downforce system, that is just one possible use of the sealing assembly, and many other uses of the sealing assembly are possible. In general, the sealing assembly of the invention may be used in application where it is desirable to restrict or direct an air flow underneath a vehicle. For instance, a sealing assembly according to the invention may be mounted under a vehicle (e.g. on a skirt under a vehicle), in order to channel or guide air flow under the vehicle in a desired manner, e.g. to improve an aerodynamic profile of the vehicle.

BRIEF DESCRIPTION OF THE DRAWINGS

Examples of the invention are discussed below with reference to the accompanying drawings, in which.

DETAILED DESCRIPTION; FURTHER OPTIONAL FEATURES

Figures 1, 2:
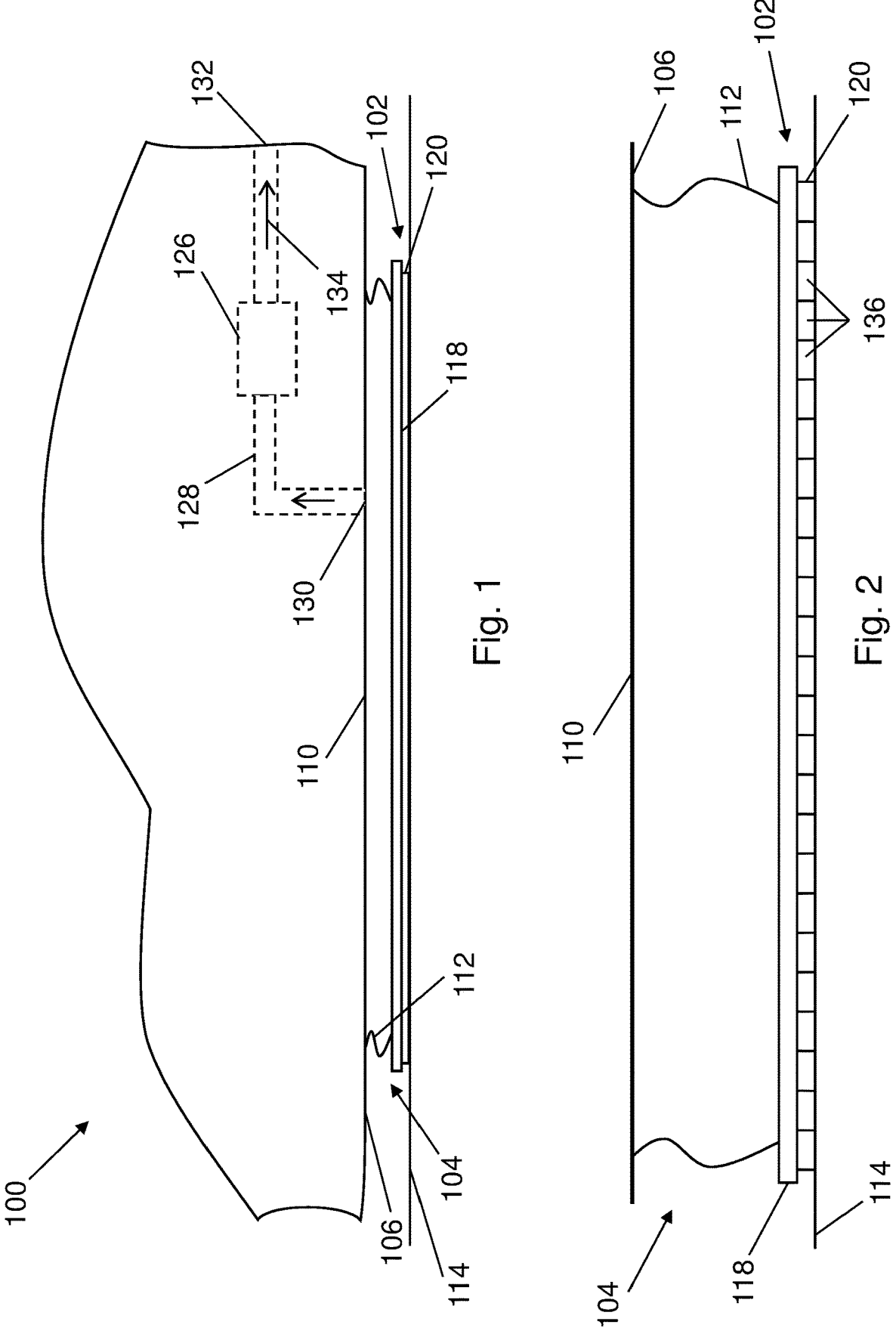
FIG. 1 is schematic side view of a vehicle according to an embodiment of the invention.
FIG. 2 is a schematic side view of a skirt according to an embodiment of the invention.
Figure 3:
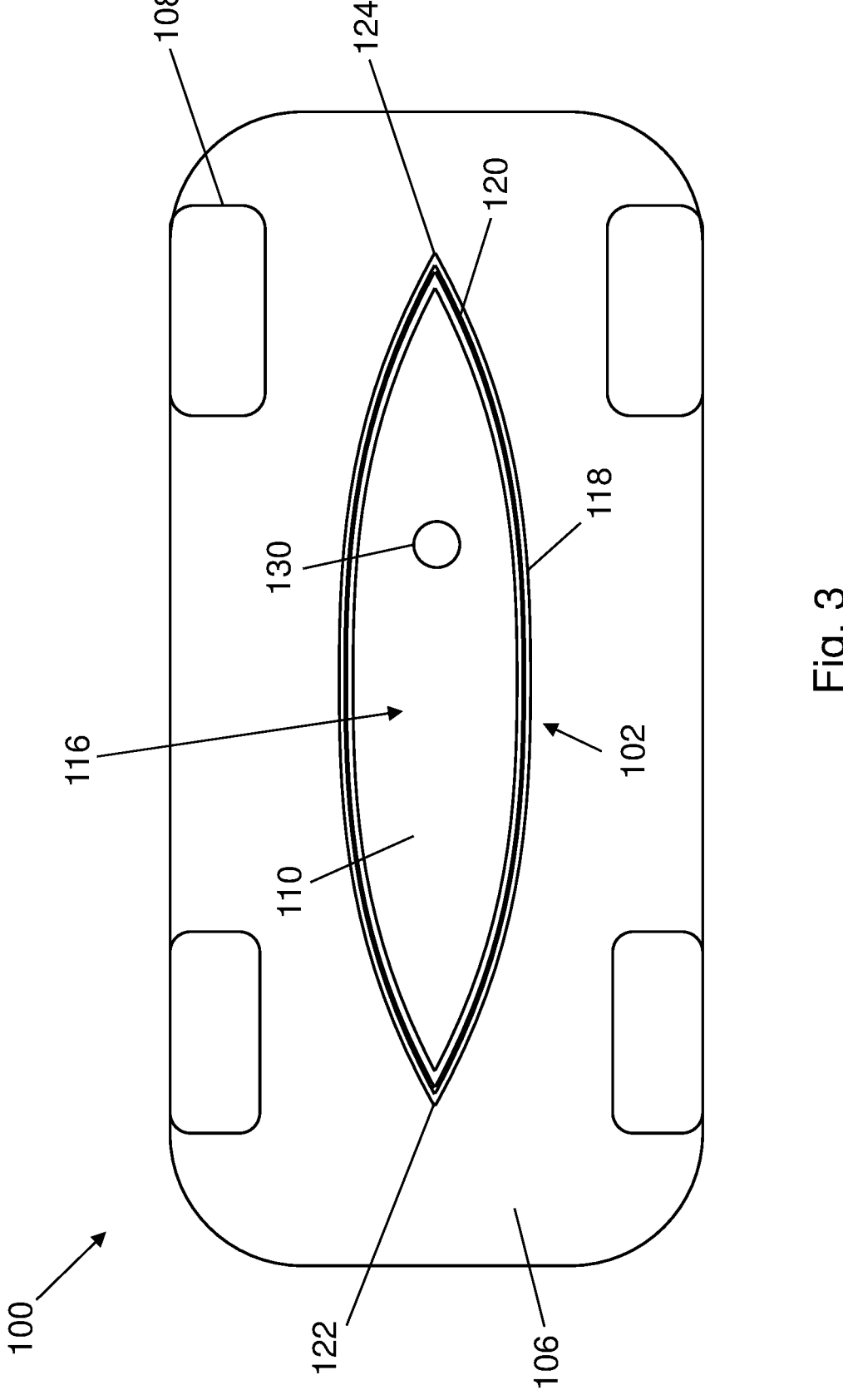
FIG. 3 is a schematic plan view of an underside of the vehicle of FIG. 1.

FIG. 1 shows a schematic side view of a vehicle 100 having a downforce system with a sealing assembly 102 according to an embodiment of the invention. In the example shown, the vehicle 100 is a car, however other types of vehicle may also be used. The downforce system of the vehicle 100 comprises a skirt 104 which is mounted on an underside 106 of the vehicle 100. An expanded side view of the skirt 104 is shown in FIG. 2, whilst a schematic view of the underside 106 of the vehicle 100 is shown in FIG. 3. It should be noted that FIGS. 1, 2 and 3 are not drawn to scale with one another. For illustration purposes, wheels 108 of the vehicle 100 are not depicted in FIG. 1, so that the skirt 104 can be seen clearly; however the wheels 108 are shown in the view of FIG. 3.

An upper surface 110 of the skirt 104 is mounted on the underside 106 of the vehicle 100. The upper surface 110 of the skirt 104 may be formed by a plate that is mounted on the underside 106 of the vehicle 100. Alternatively, all or part of the upper surface 110 of the skirt 104 may be formed by a portion of the underside 106 of the vehicle 110. In some cases, the upper surface 100 of the skirt 104 may be arranged within a cavity that is formed in the underside 106 of the vehicle 100. A divider 112 is connected at an upper end to the upper surface 110, and extends downwards towards a ground surface (e.g. a road) 114 on which the vehicle 100 is disposed. The divider 112 forms a closed shape, such that it acts as a barrier that defines a perimeter of a region 116 over the ground surface 114 under the vehicle 100.

The sealing assembly 102 is a part of the skirt 104 that is disposed at a lower end of the divider 112, i.e. at an end of the divider 112 closest to the ground surface 114. The sealing assembly 102 comprises a frame 118 which is mounted at the lower end of the divider 112, and extends along the lower end of the divider 112. Thus, the frame 118 forms a closed shape corresponding to the closed shape of the divider 112, such that the frame 118 is arranged around the perimeter of the region 116 over the ground surface 114 defined by the divider 112. A sealing strip 120 is provided on a ground facing-surface of the frame 118, such that the sealing strip 120 is arranged to contact the ground surface 114 and slide along the ground surface 114 when the vehicle 100 moves over the ground surface 114. In this manner, the sealing strip 120 may be brought into contact with the ground surface 114 to form an at least partial seal with the ground surface 114, in order to restrict air flow between the frame 118 and the ground surface 114. The sealing strip 120 extends around the closed shape formed by the frame, such that the sealing strip 120 extends around the perimeter of the region 116 defined by the divider 112. As a result, when the sealing strip 120 is contact with the ground surface 114, the sealing strip 120 may act to restrict air flow between the region 116 inside the divider 112 and the surrounding atmosphere. Thus, when the sealing strip 120 is in contact with the ground surface 114, the region 116 may correspond to a volume that is substantially enclosed between the skirt 104 (which includes the upper surface 110, divider 112 and sealing assembly 102) and the ground surface 114. The skirt 104 may therefore act to restrict air flow between the region 116 and the surrounding atmosphere.

A shape of the region 116 defined by the divider 112 over the ground surface 114 is shown in FIG. 3. As can be seen, the region 116 has a pointed oval shape which is arranged along a longitudinal direction of the vehicle 100, i.e. it is aligned along a direction of forward travel of the vehicle 100. In other words, the region 116 has pointed ends which are arranged near front and rear ends of the vehicle 100, respectively. Thus, the sealing assembly 102 (and similarly the divider 112) has a first pointed end 122 arranged near the front end of the vehicle 100, and a second pointed 124 end arranged near the rear end of the vehicle 100. Such a pointed oval shape of the region 116 may serve to reduce an aerodynamic drag produced by the skirt 104 and the sealing assembly 102. Of course, in other examples, the region 116 may have other suitable shapes. For example, the divider 112 may be arranged to define a region having an oval shape with rounded ends, or the divider 112 may be arranged to define a region having a rectangular shape or some other shape.

In some cases, the sealing assembly 102 may further include an outer sealing strip (not shown), which is mounted on the frame 118 and arranged on an outer side of the sealing strip 120, such that it is disposed concentrically around the sealing strip 120. This may serve to improve a quality of the at least partial seal with the ground surface 114, as the outer sealing strip may act to restrict air leakage through the plurality of seal elements 136 forming the sealing strip 120. The outer sealing strip may define a continuous perimeter around the outside of the sealing strip 120, such that together the sealing strip 120 and the outer sealing strip form a double-barrier around the region 116. However, the outer sealing strip 120 need not necessarily extend continuously around the sealing strip 120, e.g. it may include multiple sections extending along the outer side of different portions of the sealing strip 120. A cavity (not shown) may be provided between the sealing strip 120 and the outer sealing strip. The cavity may comprise turbulence generating features such as turbulators, e.g. twisted tape turbulators or matrix turbulators, or baffles. The cavity may be provided with controlled leakage paths which may allow air to leak into or out of the cavity to generate turbulence in the cavity. The outer sealing strip may be formed as a plurality of seal elements (e.g. similar to seal elements 136), or it may be formed as a single strip of material (e.g. a suitable plastic) which is mounted to the frame 118. Alternatively the outer sealing strip may be integrally formed as part of the sealing strip 120. For example, at least one of the plurality of seal elements 136 may comprise an outer portion that serves to improve a quality of the at least partial seal with the ground surface 114 by providing at least part of an outer sealing strip and a cavity on an inside of the at least part of an outer sealing strip. In this way the outer sealing strip and the sealing strip 120 may be integrally formed.

In the example shown, the divider 112 is formed by a flexible piece of material, such as a textile material or similar. Examples of suitable materials include Nylon, rubber, or thin composite materials. As the divider 112 is flexible, this enables the frame 118 to move relative to the upper surface 110 (and therefore relative to the underside 106 of the vehicle 100). In particular, the divider 112 may deform (e.g. flex or bend) to enable relative movement between the upper surface 110 and the frame 118. As a result, when a height of the underside 106 of the vehicle 100 above the ground surface 114 changes, the divider 112 may flex or bend in response to such change, so that the sealing strip 120 remains in contact with the ground surface 114. This may, for example, facilitate maintaining the at least partial seal between the sealing strip 120 and the ground surface 114 when the height of the underside 106 of the vehicle 100 above the ground surface 114 changes, e.g. due to the vehicle 100 turning or going over a bump in the ground surface 114. However, the divider 112 need not necessarily be made of a flexible piece of material in order to enable relative movement between the upper surface 110 and the frame 118. For instance, in some cases, the divider may be in the form of a telescopic coupling between the upper surface 110 and the frame 118. Such a telescopic coupling may include two or more telescopic sections which are movable relative to one another, to enable relative movement between the upper surface 110 and the frame 118.

The downforce system of the vehicle 100 includes a pressure source 126 which is configured to generate a pressure differential across the divider 112. The pressure source 126 is disposed on an air flow path 128 between an outlet 130 of the skirt 104 and an outlet 132 of the downforce system. The outlet 130 of the skirt 104 is formed as an aperture in the upper surface 110 of the skirt 104 (see FIG. 3), whilst the outlet 132 of the downforce system is formed as an aperture in a body of the vehicle 100 located towards the rear end of the vehicle 100. The pressure source 126 is configured to cause air to flow out of the region 116 inside the divider 112, and along the air flow path 128, as illustrated by arrows 134 in FIG. 1. As an example, the pressure source 126 may be a fan which is arranged to generate an air flow along the air flow path 128. Note that for illustration purposes, the pressure source 126 and air flow path 128 are shown with dashed lines to indicate that they are disposed within the vehicle 100, i.e. they would not normally be visible from outside the vehicle 100.

When the pressure source 126 is activated, air may flow out of the region 116 via the outlet 130 of the skirt 104, along the air flow path 128, and out of the outlet 132 of the downforce system. Therefore, when the pressure source 126 is activated, air may be evacuated from the region 116, which may result in a drop in pressure in the region 116 compared to atmospheric pressure. Due to the drop in pressure in region 116, a pressure differential may be generated across the divider 112, due to a difference between the atmospheric pressure surrounding the divider 112 and the lower pressure in the region 116 inside the divider. Such a pressure differential may result in a downforce acting on the vehicle 100, which may result in an improved grip of the vehicle 100 on the ground surface 114. Contact of the sealing strip 120 with the ground surface 114 may serve to significantly restrict air leakage into the region 116 when the pressure source 126 is activated, which may facilitate maintaining a low pressure in the region 116, and thus increasing a downforce that can be achieved with the downforce system of the vehicle 100. The downforce system may further include one or more filters that are arranged along the air flow path 128, in order to capture any dust or debris travelling along the air flow path 128. This may avoid dust or debris from being ejected from the downforce system via the outlet 132.

As shown in FIG. 2, the sealing strip 120 is formed of a plurality of individual seal elements 136 which are mounted adjacent to one another on the frame 118. For illustration purposes, the individual seal elements 136 are not depicted in FIGS. 1 and 3. Each of the plurality of seal elements 136 is arranged to contact the ground surface 114, such that together the plurality of seal elements 136 can form a substantially continuous barrier between the frame 118 and the ground surface 114 to restrict air flow between the frame 118 and the ground surface 114. The frame 118 is made of a material that has a greater flexibility compared to a material of each of the plurality of seal elements 136. Thus, the frame 118 may be made of a relatively flexible material, whilst the plurality of seal elements 136 may be made of a relatively rigid material. The relative flexibility of the frame 118 enables it to bend and/or flex in response to variations in the ground surface 114. For example, the frame 118 may bend when the vehicle 100 travels over a bump in the ground surface 114. In particular, the frame 118 may have a greater flexibility in a direction normal to the ground surface 114 compared to each of the plurality of seal elements 136. In other words, the frame 118 may be bendable towards or away from the ground surface 114 more easily than each of the plurality of seal elements 136. This may ensure that the frame 118 can be deflected towards or away from the ground surface 114, e.g. in order to at least partial conform with bumps or dips in the ground surface 114.

Forming the sealing strip 120 as a plurality of seal elements 136 mounted on the frame 118 enables an amount of relative movement between adjacent seal elements 136 when the frame 118 bends or flexes. In this manner, despite the relative rigidity of each of the seal elements 136, the sealing strip 120 as a whole may still allow bending and flexing of the frame 118. As a result, the sealing assembly 102 may be flexible such that it can bend or flex in order to at least partially conform to variations in the ground surface 114 as the vehicle 100 travels over the ground surface 114. Enabling the sealing assembly 102 to bend or flex in response to variations in the ground surface 114 may facilitate maintaining contact between the sealing strip 120 and the ground surface 114 as the vehicle 100 travels over the ground surface 114, which may facilitate maintaining a low pressure inside the region 116.

Each of the plurality of seal elements 136 may be made of a substantially rigid and abrasion-resistant material. This may ensure that the plurality of seal elements 136 can withstand large forces and impacts, as well as high temperatures that may arise during sliding contact with the ground surface 114. For example, suitable materials for the plurality of seal elements 136 include ceramic materials, composite ceramic materials, and/or carbide materials, as these typically have a high rigidity, high abrasion resistance, and are capable of withstanding high temperatures. In some cases, each of the plurality of seal elements 136 may be provided with an abrasion resistant coating (e.g. made of TiN), to further improve abrasion resistance. The frame 118 may be made of a more lightweight and flexible material, such as aluminium, carbon fibre, fibre glass, and/or plastic.

In some embodiments, the skirt 104 may further comprise an actuator (not shown), which is configured to move the frame 118 relative to the upper surface 110 between a deployed position where each of the plurality of seal elements 136 is arranged to contact the ground surface 114 (e.g. as in FIG. 2), and a stowed position where the plurality of seal elements 136 is spaced apart from the ground surface 114. In other words, the actuator may raise and lower the frame 118 between the stowed and deployed positions. In this manner, when the downforce system of the vehicle 100 is not in use, the frame 118 may be raised into the stowed position so that the sealing strip 120 does not contact the ground surface 114. This may serve to protect the sealing assembly 102 when it is not in use. In some cases, a cavity may be formed in the underside 106 of the vehicle 100 to receive the sealing assembly 102 when the frame 118 is raised into the stowed position. The actuator may be connected between the upper surface 110 and the frame 118, so that it can control a position of the frame 118 relative to the ground surface 114. The actuator may include any suitable type of actuator. For example, a pneumatic or a hydraulic cylinder which is operable to control a position of the frame 118 relative to the ground surface 114.

In some embodiments, the skirt 104 may also be arranged to apply a force to the frame 118 in order to press the sealing strip 120 (i.e. the plurality of seal elements 136) against the ground surface 114. This may serve to improve a quality of the at least partial seal formed by the sealing strip 120 with the ground surface 114. For example, the actuator mentioned above for raising and lowering the frame 118 relative to the ground surface 114 may also be arranged to apply a downwards force to the frame 118 when it is in the deployed position, such that the sealing strip 120 is pressed against the ground surface 114. Additionally or alternatively, a biasing element (not shown) may be used to apply a downwards force to the rim. For example, a spring may be mounted between the upper surface 110 and the frame 118, and arranged to apply a force to the frame 118 to press the sealing strip 120 against the ground surface 114.

The vehicle 100 may include a controller, e.g. in the form of an on-board computer in the vehicle 100, which is configured to control the downforce system of the vehicle 100. Such a controller may be configured to control the pressure source 126, as well as any actuators of the skirt 104, in order to control generation of a downforce by the downforce system.

Figures 4A, 4B:
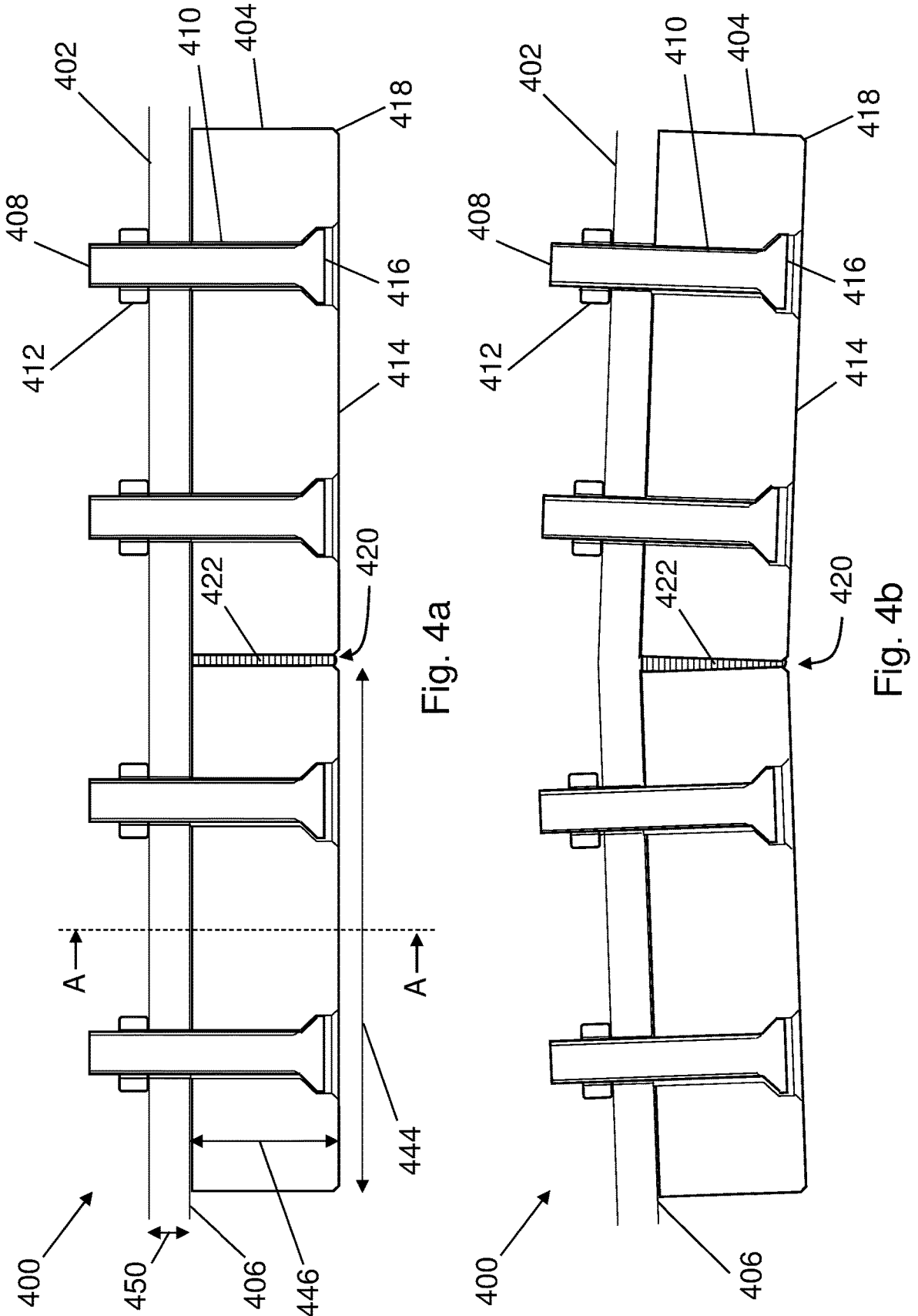
FIGS. 4*a* and 4*b* are schematic cross-sectional side views of a sealing assembly according to an embodiment of the invention.

FIGS. 4a and 4b are schematic cross-sectional views of a sealing assembly 400 according to an embodiment of the invention. The sealing assembly 400 may be used as part of a skirt in a downforce system of a vehicle. For example, the sealing assembly 400 may correspond to the sealing assembly 102 discussed above in the context of the vehicle 100. The sealing assembly 400 comprises a frame 402, on which a plurality of seal elements 404 are mounted adjacent to one another to form a sealing strip. FIGS. 4a and 4b depict only a portion of the sealing assembly 400 where two seal elements 404 are mounted next to each other on the frame 402. However, in reality, the sealing assembly 400 may extend beyond the portion illustrated in FIGS. 4a and 4b. For example, the frame 402 may form a closed shape in a similar manner to the frame 118 discussed above, with seal elements 404 mounted along the entire frame 402 to form a sealing strip.

In a similar manner to that discussed above in relation to the sealing assembly 102, the frame 402 has a greater flexibility than each of the seal elements 404. The materials discussed above in relation to the frame 118 and seal elements 136 of the sealing assembly 102 may be used for the frame 402 and the seal elements 404, respectively. Each of the seal elements 404 comprises a block of material which is mounted against a mounting surface 406 of the frame 402 via a pair of bolts 408. A pair of through-holes 410 is formed in each seal element 404, with matching through-holes being formed in the frame 402. The bolts 408 each pass through a respective through-hole in the seal elements 404 and the frame 402, such that an end of each bolt 408 protrudes above an upper surface of the frame 402. A nut 412 is tightened around the end of each bolt 408, in order to secure the seal elements 404 in place. As the seal elements 404 are bolted to the frame 402, they may be easily mounted to, and removed from the frame. This may facilitate replacing and repairing the seal elements 404.

Each seal element 404 has a ground-engaging surface 414 which is substantially flat and arranged to contact a ground surface under the vehicle and slide along the ground surface. As shown in FIGS. 4a and 4b, the through-holes 410 in the seal elements 404 are provided with counterbored and/or countersunk openings in the ground-engaging surfaces 414 of the seal elements 404. In this manner, a head 416 of each of the bolts 408 may be recessed within the seal element 404, such that the head 416 of the bolt 408 does not protrude beyond the ground-engaging surface 414. This may serve to protect the heads 416 of the bolts 408, which may typically be more vulnerable to abrasion than the seal elements 404. Furthermore, front and rear edges 418 of the ground-engaging surfaces 414 are chamfered. This may improve a resistance of the front and rear edges 418 of the ground-engaging surfaces 414 to cracking or breaking. The front and rear edges 418 of the ground-engaging surfaces 414 may further be rounded, in order to further improve their resistance to cracking or breaking.

The sealing assembly 400 may further comprise a padding material (not shown) for enabling a small amount of relative movement between each of the seal elements 404 and the frame 402. In particular, the padding material may be arranged to deform in response to an impact between the seal elements 404 and the ground surface, to dissipate energy from the impact and thereby reduce a risk of the seal elements 404 cracking or breaking. As an example, padding material may be disposed in each through-hole 410, such that the padding material is disposed between the seal element 404 and the bolt 408 within the through-hole. In particular, the padding material may be in the form of a sleeve arranged around a shaft of the bolt 408 within the through-hole 410. The padding material may also be disposed within the counterbored or countersunk opening of the through-hole 410, such that it is disposed between the head 416 of the bolt and the seal element 404. Additionally or alternatively, padding material may be disposed in the through-holes formed in the frame 402, such that the padding material is arranged between the bolts 408 and the frame 402. Padding material may also be arranged between each of the seal elements 404 and the frame 402, e.g. a layer of padding material may be disposed between the seal elements 404 and the frame 402. As a further possibility, padding material may be disposed between the nuts 412 and the frame 402, e.g. the padding material may be compressed between the nuts 412 and the frame. The padding material may be made of a material having a greater flexibility than the seal elements 404 and the frame 402. In this manner, the padding material may deform (e.g. stretch and/or compress) in response to an impact of one of the seal elements 404 against the ground surface. The padding material may comprise any suitable compressible (e.g. elastic, resilient) material, such as rubber or a foamed material.

The plurality of seal elements 404 are mounted on the frame 402 such that a respective gap 420 is formed between pairs of adjacent seal elements 404. The gap 420 between a pair of adjacent seal elements 404 serves to enable an amount of relative movement between the adjacent seal elements 404 when the frame 402 bends or flexes. As a result, bending of the frame 402 may be facilitated in the vicinity of the gap 420 between adjacent seal elements 404, thus improving overall flexibility of the sealing assembly 400. In order to minimise air leakage through the gap 420 between adjacent seal elements 404, the gap 420 is filled with a filler material 422. The filler material 422 has a greater flexibility than each of the seal elements 404 and the frame 402, and is preferably highly flexible and deformable, such that it does not inhibit bending of the frame 402. As a result, flexibility of the sealing assembly 400 may be improved, whilst minimising air leakage through the sealing strip. For example, the filler material 422 may comprise a high temperature silicone, sealant or liquid gasket.

FIG. 4a shows a configuration of the sealing assembly 400 where the frame 402 is unbent. FIG. 4b shows a configuration of the sealing assembly 400 where the frame 402 is bent near the gap 420 between the two depicted seal elements 404. As can be seen in FIG. 4b, the frame 402 is bent such that the ground-engaging surfaces 414 of the seal elements 404 move closer together, i.e. the gap 420 between the seal elements 404 partially closes towards the ground-engaging surfaces 414. This causes the filler material 422 filling the gap 420 to be temporarily compressed and/or displaced near the ground-engaging surfaces 414. On the other hand, bending of the frame 402 in the opposite direction may cause the ground-engaging surfaces 414 of the seal elements 404 to move apart from one another, such that the filler material 422 may become stretched near the ground-engaging surfaces 414. In the example shown in FIG. 4b, the frame 402 is bent such that there is an angle of about 4° between the ground-engaging surfaces 414 of the two depicted seal elements 404. More generally, the size of the gap 420, the properties of the filler material 422, and the shapes of the seal elements 404 may be selected in order to allow a desired amount of bending of the frame 402.

Figures 5, 6:
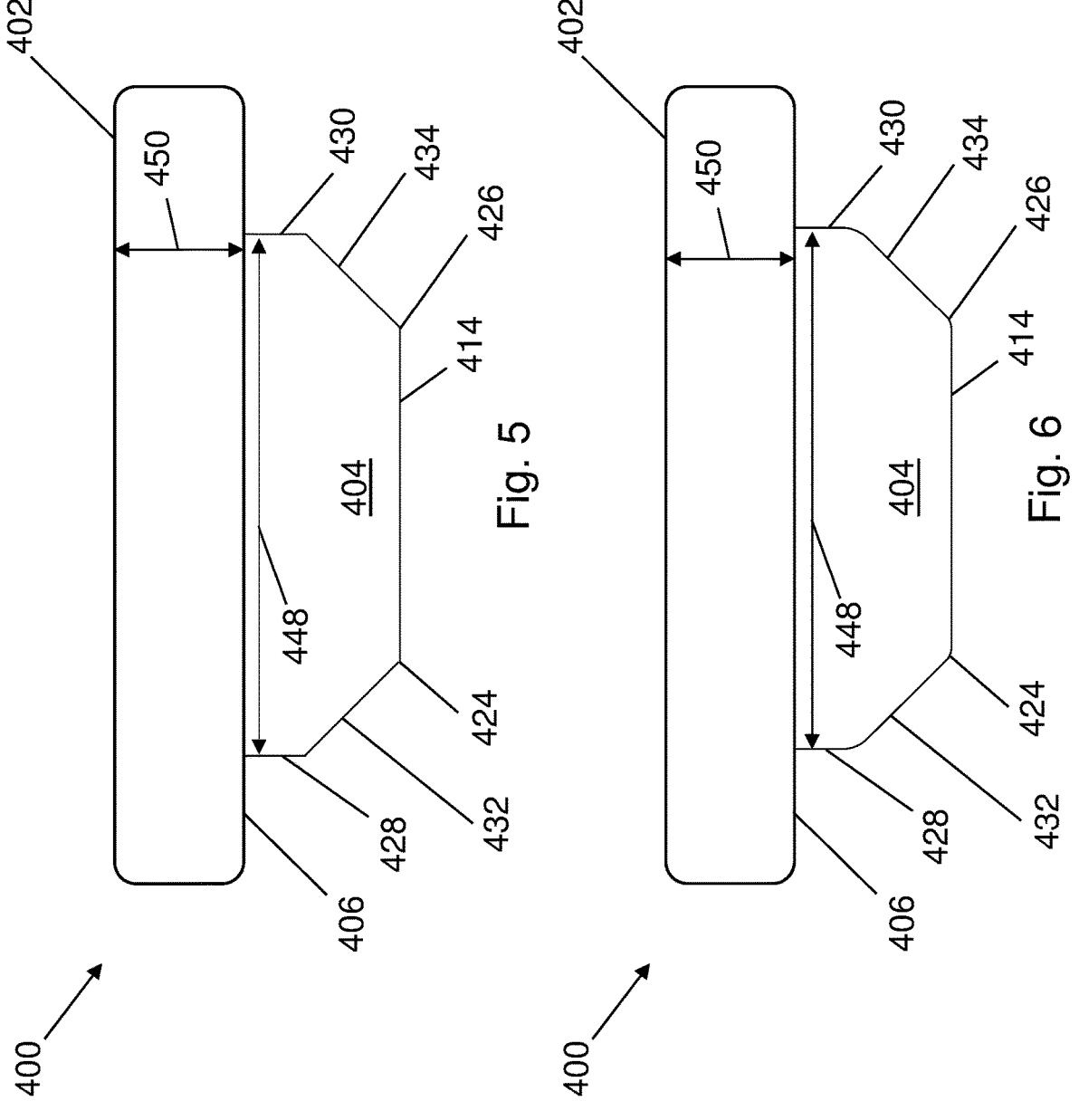
FIG. 5 is a schematic cross-sectional front view of the sealing assembly of FIGS. 4*a* and 4*b* according to a first embodiment.
FIG. 6 is a schematic cross-sectional front view of the sealing assembly of FIGS. 4*a* and 4*b* according to a second embodiment.

By way of example, each seal element 404 may have a length 444 of about 50 mm, a height 446 between about 5 mm and 15 mm, and a width 448 of about 25 mm (width 448 is indicated in FIGS. 5 and 6, discussed below). The gap 420 between the pair of adjacent seal elements 404 may have a width between about 0.5 mm and 5 mm, i.e. the adjacent seal elements may be separated by a distance between about 0.5 mm and 5 mm. The frame 402 may have a thickness 450 that is between about 4 mm and 10 mm.

FIGS. 5 and 6 show alternative cross-sectional views of the sealing assembly 400. The cross-sectional views of FIGS. 5 and 6 are taken along plane AA indicated in FIG. 4a, which is normal to the plane of the cross-sectional views depicted in FIGS. 4a and 4b. For illustration purposes, the bolts 408 and nuts 412 are not shown in FIGS. 5 and 6. As shown in FIG. 5, side edges 424, 426 of the ground engaging surfaces 414 of the seal elements 404 are chamfered, in order to avoid right-angle corners at the side edges of the ground engaging surfaces 414. In other words, side surfaces 428, 430 of each seal element 404 are connected to the ground-engaging surface 414 of the seal element 404 via respective intermediate surfaces 432, 434 which are slanted (e.g. at an angle of around 45°) relative to the ground-engaging surface 414. This may improve a durability of the seal elements 404, as right-angle corners may typically be more vulnerable to cracking or breaking. In the embodiment of FIG. 6, the edges of the intermediate surfaces 432, 434 are further rounded, in order to avoid any sharp corners on the sides of the seal elements 404. This may further improve a resistance of the seal elements 404 to cracking and breaking.

Figure 7:
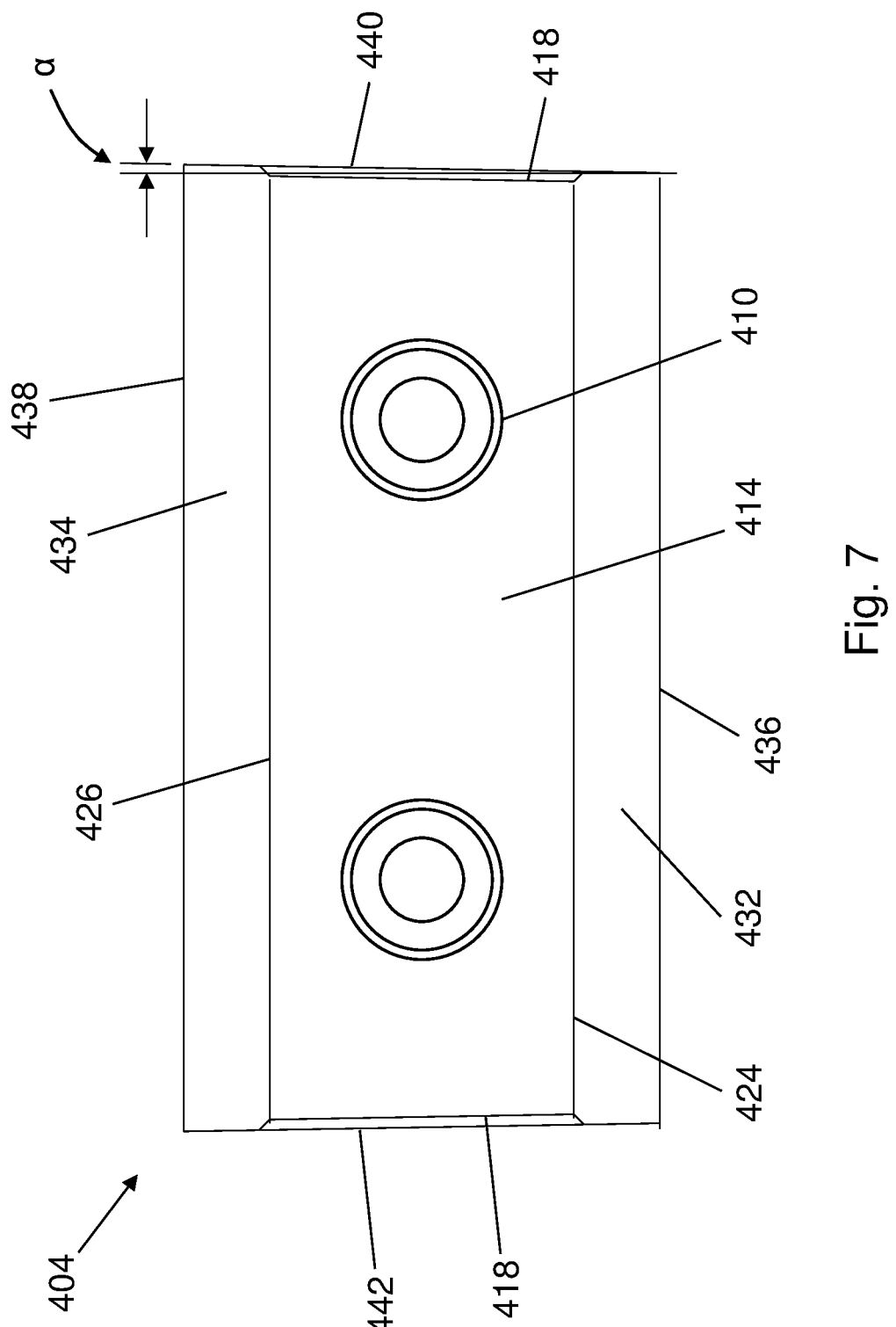
FIG. 7 is a schematic plan view of an underside of a seal element of the sealing assembly of FIGS. 4*a* and 4*b;*

FIG. 7 shows a schematic plan view of a seal element 404 that is part of the sealing assembly 400. The schematic plan view of FIG. 7 shows the ground-engaging surface 414 of the seal element 404, in which the countersunk or counterbored openings for the through-holes 410 are formed. FIG. 7 further depicts the chamfered front and rear edges 418 of the ground-engaging surface 414, as well as the chamfered side edges 424, 426 of the ground-engaging surface 414. The side edges 424, 426 of the ground-engaging surface are chamfered as shown in FIG. 5, with the intermediate surfaces 432, 434 being visible in the plan view of FIG. 7.

As can be seen in FIG. 7, the seal element 404 has an approximately rectangular shape. However, in the example shown, the seal element 404 is not strictly rectangular, as it has opposing sides with slightly different lengths. In particular, the seal element 404 includes an inner side 436 and an outer side 438 which are substantially parallel and arranged on opposite sides of the seal element 404 with respect to a longitudinal direction of the seal element 404, with the outer side 438 being slightly longer than the inner side 436. The inner and outer sides 436, 438 are arranged such that, when the ground-engaging surface 414 of the seal element 404 contacts a ground surface to form an at least partial seal therewith, the inner side 436 faces towards an inside of the at least partial seal, and the outer side 438 faces towards an outside of the at least partial seal. So, for example, where the seal element 404 is used as part of the sealing strip 120 discussed above, when the sealing strip 120 contacts the ground surface 114, the inner side 436 may face towards the region 116 inside the divider 112 whilst the outer side 438 may face towards the atmosphere surrounding the divider 112.

As a result of the slightly longer outer side 438 compared to the inner side 436, a front side 440 and a rear side 442 of the seal element 404 are angled relative to one another, i.e. they are not parallel. This can be seen in FIG. 7, where an angle between the outer side 438 and the front side 440 is less than 90° by an angle of a. Similarly, an angle between the outer side 438 and the rear side 442 is less than 90° by the same angle α, such that the front side 440 and rear side 442 are slanted towards one another at the inner side 436. For example, a may be about 1°. Making the outer side 438 slightly longer than the inner side 436 in this manner may facilitate forming a sealing strip which has a curved shape. In particular, where multiple seal elements are used having the shape of the seal element 404 shown in FIG. 7, these may be mounted on a frame adjacent to one another along a curved portion of a frame (e.g. curved portions of the frame 118 shown in FIG. 3), in order to form a curved portion of the sealing strip. The longer outer side 438 compared to the inner side 436 of the seal element 404 may ensure that gaps between adjacent seal elements 404 are minimised, as this may avoid the gaps becoming larger towards the outer side 438 of the seal elements 404. Thus, the shape of the seal element 404 may facilitate forming a curved portion of a sealing strip, whilst minimising air leakage through the sealing strip.

Figure 8:
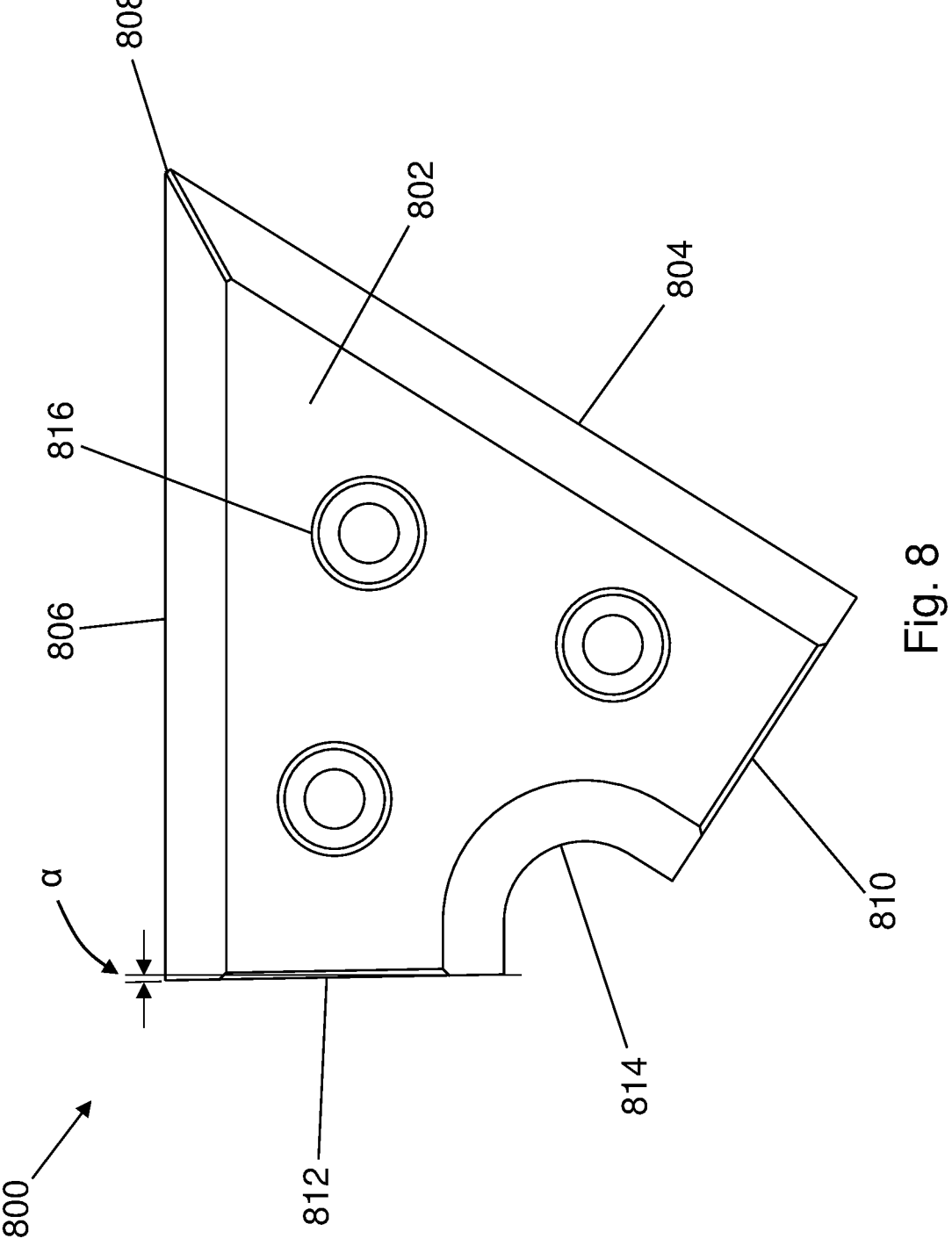
FIG. 8 is a schematic plan view of an underside of a seal element that may be part of a sealing assembly according to an embodiment of the invention.

FIG. 8 shows a schematic plan view of a seal element 800 that may be part of a sealing assembly that is an embodiment of the invention. The seal element 800 may be made of similar materials to those discussed above in relation to seal elements 136. The seal element 800 has a substantially planar ground-engaging surface 802 for contacting the ground surface and sliding along the ground surface. In a similar manner to the seal element 404 discussed above, the ground-engaging surface 802 of the seal element 800 has chamfered edges, in order to avoid right-angle corners around the ground-engaging surface 802. The seal element 800 has a first outer side 804 and a second outer side 806 which join together at a pointed tip 808. The first and second outer sides 804, 806 may be substantially straight. The seal element 800 further comprises a third side 810 which forms a corner with the first outer side 804, and a fourth side 812 which forms a corner with the second outer side 806. A curved inner surface 814 is arranged between the third and fourth sides 810, 812. As shown in FIG. 8, the pointed tip 808 may be chamfered, in order to minimise a risk of the pointed tip 808 breaking.

Three through-holes 816 are formed in the seal element 800, for securing the seal element to a frame of a sealing assembly. Thus, in a similar manner to the seal element 404, the seal element 800 may be mounted to a frame via a set of bolts and nuts. Openings of the through-holes 816 in the ground-engaging surface 802 are countersunk and/or counterbored, so that heads of the bolts used for mounting the seal element 800 can be recessed within the seal element 800.

The third side 810 of the seal element 800 is arranged to face towards a first adjacent seal element when the seal element 800 is mounted on a frame as part of a sealing strip. Likewise, the fourth side 812 of the seal element 800 is arranged to face towards a second adjacent seal element when the seal element 800 is mounted on a frame as part of a sealing strip. As an example, the first and second adjacent seal elements may each correspond to a seal element as depicted in FIG. 7 (i.e. seal element 404). Then, the seal element 800 may be mounted such that its third side 810 faces towards a front side 440 of the first adjacent seal element, and such that its fourth side 812 faces towards a front side 440 of the second adjacent seal element. Thus, the seal element 800 may be used to form a pointed end of a sealing strip, from which two series of seal elements extend.

As shown in FIG. 8, an angle between the second outer side 806 and the fourth side 812 may be less than 90° by an angle of a. Similarly, an angle between the first outer side 804 and the third side 810 may be less than 90° by the angle of a. For example, a may be about 1°. Such a configuration may facilitate forming a sealing strip having a curved shape. Where the sealing strip includes seal element 800 together with seal elements as depicted in FIG. 7, the angles α shown in FIGS. 7 and 8 may be substantially the same.

The seal element 800 is designed to be arranged at a front end and/or at a rear end of a sealing strip that is formed of a plurality of seal elements. Where the seal element 800 is at a front end of the sealing strip, its pointed tip 808 may face in a forward direction of the sealing strip, and where the seal element 800 is at a rear end of the sealing strip, its pointed end may face in a rearwards direction of the sealing strip. This may serve to reduce an aerodynamic drag of the sealing strip. For example, the sealing strip 120 discussed above may include two seal elements 800 according to FIG. 8, one of which is arranged at the first pointed end 122 of the sealing strip 120 and the other of which is arranged at the second pointed end 124 of the sealing strip 120. Then, the remainder of the sealing strip 120 may be formed using seal elements 404 according to FIG. 7, in order to form the curved portions of the sealing strip 120 between the first and second pointed ends 122, 124.

In other embodiments, seal elements having different shapes to that of seal element 800 may be used at front and rear ends of a sealing strip. For example, a seal element having a rounded or cropped tip (e.g. rather than the pointed tip 808 of seal element 800) may be used.

As discussed above, seal elements 404 and 800 are configured to be mounted to a frame of a sealing assembly using a set of bolts and nuts. However, it will be appreciated that other means may be used for mounting seal elements to a frame in a sealing assembly according to the invention. In some embodiments, other types of mechanical fasteners may be used for mounting the seal elements to the frame, such as screws, rivets or clamps. In other embodiments, the seal elements may be mounted to the frame using an adhesive. Where an adhesive is used, there may be no need to form any holes in the seal elements, which may facilitate manufacture of the seal elements. So for example, some embodiments may include a seal elements similar to seal element 404 and/or seal element 800, in which no through-holes are formed. Then, the seal elements may be mounted to the frame by applying a layer of adhesive between the seal elements and the frame.

Figures 9, 10:
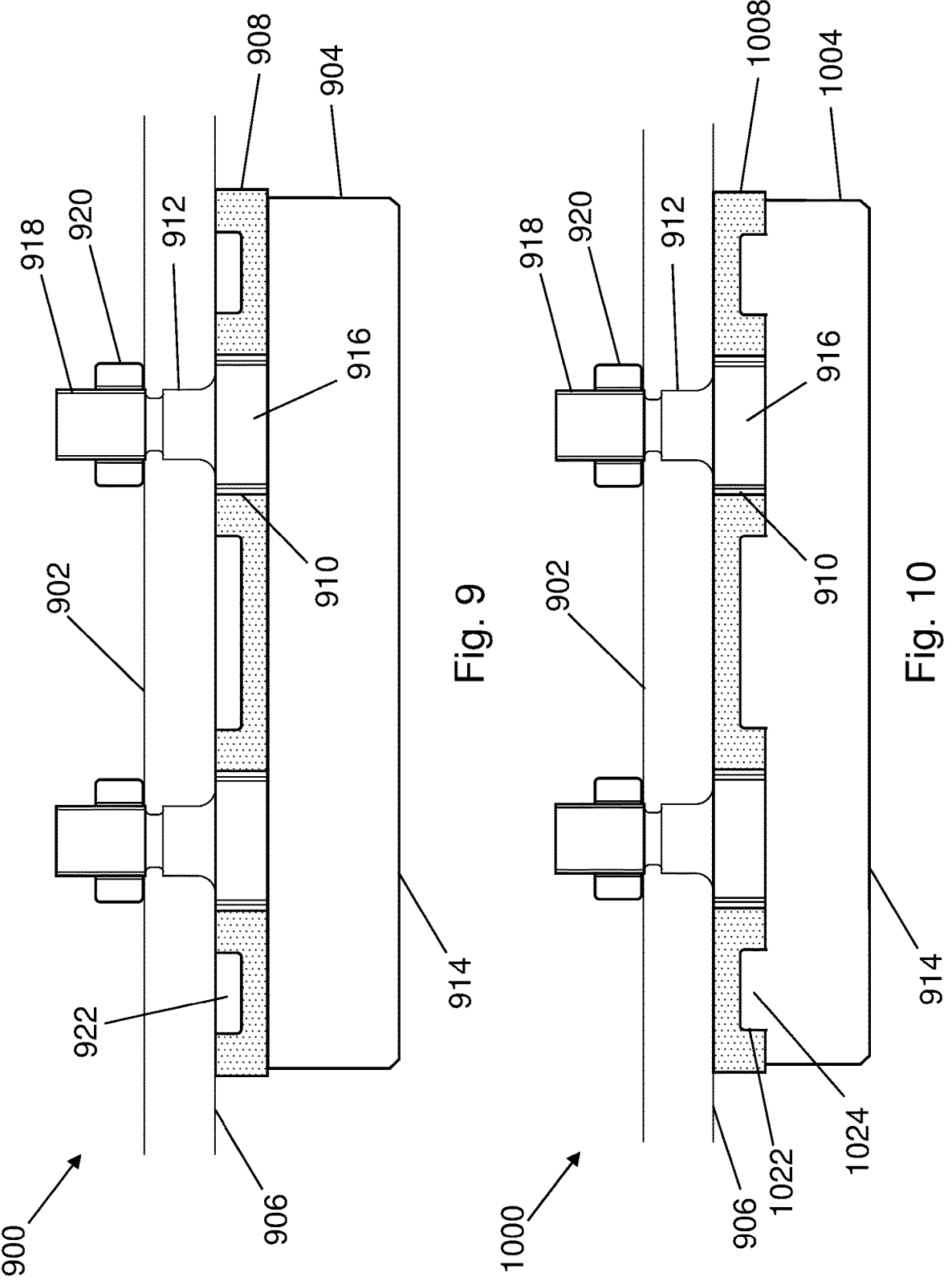
FIG. 9 is a schematic cross-sectional side view of a sealing assembly that is an embodiment of the invention.
FIG. 10 is a schematic cross-sectional side view of a sealing assembly that is an embodiment of the invention.

FIG. 9 shows a schematic cross-sectional view of a sealing assembly 900 that is an embodiment of the invention. The sealing assembly 900 may be used as part of a skirt in a downforce system of a vehicle. For example, the sealing assembly 900 may correspond to the sealing assembly 102 discussed above in the context of the vehicle 100. The sealing assembly 900 comprises a frame 902, on which a plurality of seal elements 904 are mounted to form a sealing strip. For illustration purposes, FIG. 9 only depicts a portion of the sealing assembly 900, such that only one seal element 904 is visible in FIG. 9. However, in reality, the sealing assembly 900 may extend beyond the portion illustrated in FIG. 9. For example, the frame 902 may form a closed shape in a similar manner to the frame 118 discussed above, with seal elements 904 mounted along the entire frame 902 to form a sealing strip. The materials discussed above in relation to the frame 118 and seal elements 136 of the sealing assembly 102 may be used for the frame 902 and the seal elements 904, respectively.

The seal element 904 may be similar in shape to the seal element 404 discussed above. In particular, the seal element 904 has a ground-engaging surface 914 for contacting the ground surface and sliding along the ground surface, and edges of the ground-engaging surface 914 may be rounded, chamfered or bevelled. However, unlike the seal element 404, no through-holes are formed in the seal element 904. Instead, the seal element 904 is mounted to the frame by means of an intermediate element 908. More specifically, the seal element 904 is bonded to the intermediate element 908 via an adhesive layer between the seal element 904 and the intermediate element 908, with the intermediate element 908 being itself mounted to a mounting surface 906 on the frame 902. A pair of threaded holes 910 is formed in the intermediate element 908, the threaded holes 910 in the intermediate element being aligned with corresponding holes formed in the frame 902. A first end 916 of a respective thread adapter 912 is engaged in each of the threaded holes 910 in the intermediate element 908, with the respective thread adapter 912 extending through the corresponding hole in the frame 902 such that a second end 918 of the respective thread adapter 912 protrudes above an upper surface of the frame 902. A respective nut 920 is tightened around the second end 918 of each respective thread adapter 912, in order to secure the intermediate element 908 in place. The first and second ends 916, 918 of each thread adapter 912 may have different sizes. As an example, the first end 916 of each thread adapter 912 may comprise an M8 thread, whilst the second end 918 of each thread adapter 912 may comprise an M4 thread. A benefit of using thread adapters 912 in this manner is that the thread adapters 912 may be removed from the holes 910 in the intermediate element 908 even after the seal element 904 has been bonded to the intermediate element 908, which may enable the thread adapters 912 to be replaced if needed. A thread-locking adhesive may be used on the ends of the thread adapter 912 and/or in the holes 910, in order to prevent loosening of the thread adapters 912. Although thread adapters 912 are used for mounting the intermediate element to the frame 902 in the example of FIG. 9, other mechanisms (e.g. other types of mechanical fasteners) may be used for mounting the intermediate element 908 to the frame 902.

The configuration of the sealing assembly 900 may facilitate mounting the seal element 904 on, and removing the seal element 904 from the frame 902. Indeed, to remove the seal element 904 from the frame 902, the nuts 920 may be removed in order to release the intermediate element 908, and thus the seal element 904, from the frame 902. In particular, this may facilitate removing the seal element 904 from the frame 902 compared to embodiments where the seal element 902 is bonded directly to the frame 902 via an adhesive. Moreover, as the seal element 904 does not include any though-holes, this may facilitate manufacture of the seal element 904, as well as improve a strength and durability of the seal element 904. As the seal element 904 is bonded to the intermediate element 908 via a layer of adhesive, the seal element 904 may be substantially uniformly held against the intermediate element 908. This may serve to avoid stress concentrations in the seal element 904, which may reduce a risk of the seal element 904 cracking or breaking.

The intermediate element 908 may comprise a plate of material that is shaped to fit between the seal element 904 and the frame 902. For example, the intermediate element 908 may be in the form of an aluminium plate. As shown in FIG. 9 multiple of cavities 922 are formed in the intermediate element 908. The cavities 922 may be formed in a surface of the intermediate element 908 that faces towards the mounting surface 906 of the frame, such that a series of voids are formed between the intermediate element 908 and the frame 902. Forming cavities 922 in the intermediate element 908 may serve to reduce a mass of the intermediate element 908, to reduce a total mass of the sealing assembly 900.

Although only one seal element 904 is depicted in FIG. 9, in practice each of the plurality of seal elements 904 in the seal assembly 900 may be mounted on the frame 902 via a respective intermediate element 908. In other words, a respective intermediate element 908 may be provided for each of the plurality of seal elements 904.

FIG. 10 shows a schematic cross-sectional view of a sealing assembly 1000 that is an embodiment of the invention. The sealing assembly 1000 has a similar construction to the sealing assembly 900 discussed above. Accordingly, features of the sealing assembly 1000 that correspond to features that are described above in relation to the sealing assembly 900 are indicated in FIG. 10 using the same reference numerals as in FIG. 9, and are not described again. Similar materials to those used in the sealing assembly 900 may be used for the corresponding parts of the sealing assembly 1000. Similarly to FIG. 9, FIG. only shows a portion of the sealing assembly 1000.

Like sealing assembly 900, the sealing assembly 1000 comprises a frame 902 on which a plurality of seal elements 1004 is mounted via an intermediate element 1008 (for illustration purposes, only one seal element 1004 is depicted in FIG. 10). The seal element 1004 is bonded to the intermediate element 1008 via an adhesive layer, and the intermediate element 1008 is secured to the frame via thread adapters 912 as discussed above. The intermediate element 1008 includes a set of cavities 1022 formed in a surface thereof. However, unlike intermediate element 908 where the cavities 922 face towards the frame 902, the cavities 1022 are formed in a surface of the intermediate element 1008 that faces towards the seal element 1004. The seal element 1004 comprises a set of protrusions 1024 on a surface thereof that faces towards the intermediate element 1008, with the protrusions 1024 being received in the cavities 1022 in the intermediate element 1008. The cavities 1022 and the protrusions 1024 have shapes that are complementary to one another. In this manner, the cavities 1022 and the protrusions 1024 act as engagement features which serve strengthen the connection between the seal element 1004 and the intermediate element 1008. In particular, engagement of the protrusions 1024 in the cavities 1022 may serve to increase a surface area for adhesion between the seal element 1004 and the intermediate element 1008. Provision of the cavities 1022 and the protrusions 1024 may also serve to reduce a mass of the sealing assembly 1000, e.g. by reducing a mass of the intermediate element 1008 and/or the seal element 1004. This may also result in a reduced height of the sealing assembly 1000 (e.g. compared to sealing assembly 900), which may serve to reduce air leakage through the sealing assembly 1000.

Figure 11A:
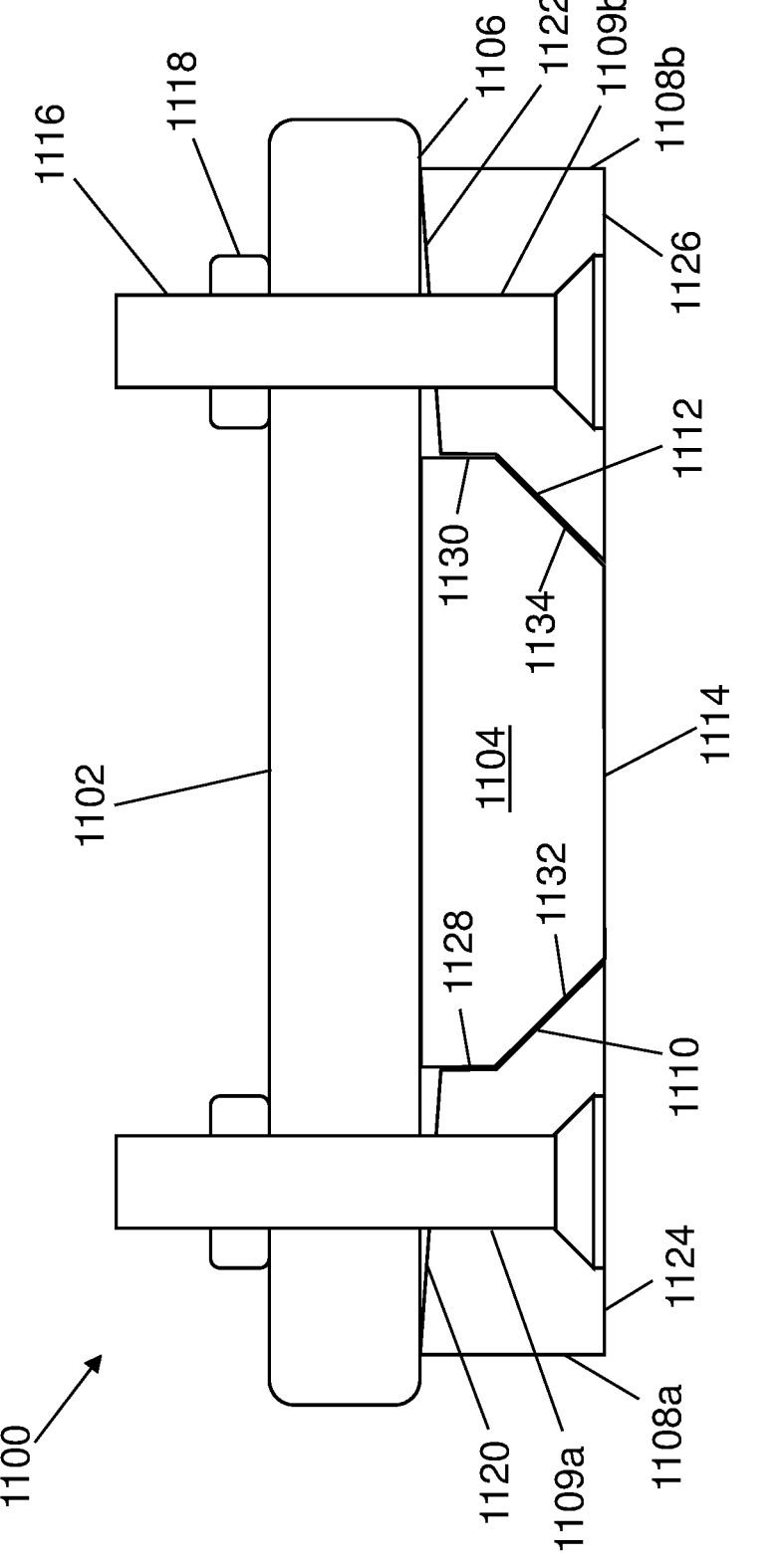
FIG. 11*a* is a schematic cross-sectional front view of a sealing assembly that is an embodiment of the invention.
Figure 11B:
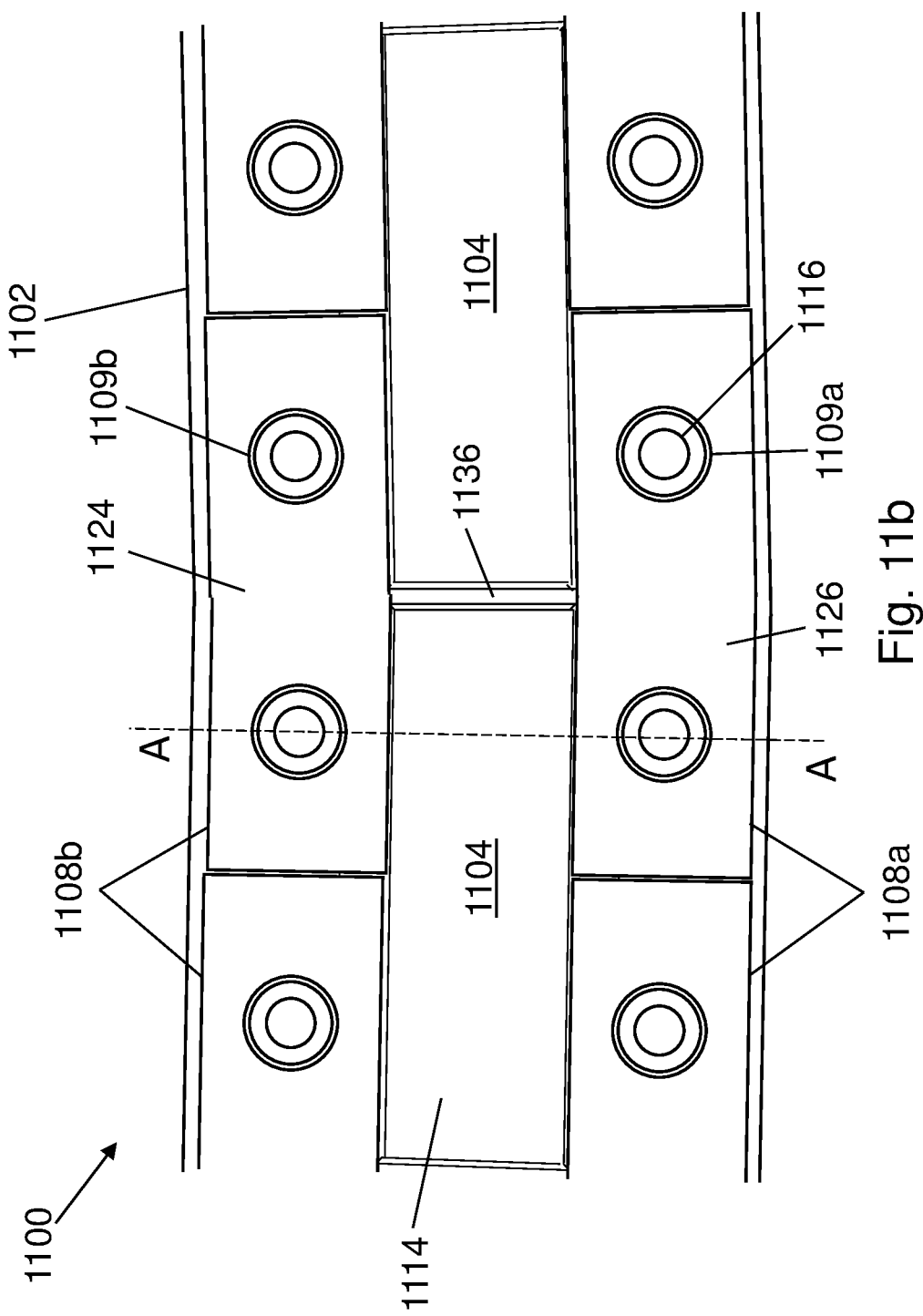
FIG. 11*b* is a schematic plan view of an underside of the sealing assembly of FIG. 11*a;*

FIGS. 11a and 11b illustrate a sealing assembly 1100 according to an embodiment of the invention. FIG. 11a shows a schematic cross-sectional view of the sealing assembly 1100, whilst FIG. 11b shows a schematic plan view of an underside of the sealing assembly 1100. The cross-sectional view of FIG. 11a is taken along plane AA indicated in FIG. 11b. The sealing assembly 1100 may be used as part of a skirt in a downforce system of a vehicle. For example, the sealing assembly 1100 may correspond to the sealing assembly 102 discussed above in the context of the vehicle 100.

The sealing assembly 1100 comprises a frame 1102, on which a plurality of seal elements 1104 is mounted adjacent to one another to form a sealing strip. The materials discussed above in relation to the frame 118 and seal elements 136 of the sealing assembly 102 may be used for the frame 1102 and the seal elements 1104, respectively. Each seal element 1104 may have a similar shape to the seal element 404 discussed above. In particular, each seal element 1104 has a ground-engaging surface 1114 configured to contact the ground surface and slide along the ground surface, with edges of the ground engaging surface 1114 being chamfered. As shown in FIG. 11a, side surfaces 1128, 1130 of each seal element 1104 are connected to the ground-engaging surface 1114 of the seal element 1104 via respective intermediate surfaces 1132, 1134 which are slanted (e.g. at an angle of around 45°) relative to the ground-engaging surface 1114. However, unlike the seal element 404, no through-holes are formed in the seal elements 1104.

The plurality of seal elements 1104 is mounted on the frame 1102 via sets of retaining elements 1108. In particular, as shown in FIG. 11b, the seal elements 1104 are held between a set of first retaining elements 1108a arranged along a first side of the seal element 1104, and a set of second retaining elements 1108b arranged along a second, opposite side of the seal element 1104. The set of first retaining elements 1108a comprises a plurality of first retaining elements 1108a which are mounted adjacent to one another on the frame 1102 along the first side of the seal elements 1104, and the set of second retaining elements 1108b comprises a plurality of second retaining elements 1108b which are mounted adjacent to one another on the frame 1102 along the second side of the seal elements 1104.

FIG. 11a illustrates how one of the seal elements 1104 is held between one of the first retaining elements 1108a and one of the second retaining elements 1108b in more detail. The first retaining element 1108a has an engagement surface 1110 that is arranged to engage the side surface 1128 and intermediate surface 1132 on the first side of the seal element 1104. Similarly, the second retaining element 1108b has an engagement surface 1112 that is arranged to engage the side surface 1130 and intermediate surface 1134 on the second side of the seal element 1104. Respective through-holes 1109a, 1109b are formed through each of the first and second retaining elements 1108a, 1108b, which are aligned with corresponding holes on the frame 1102. In this manner, the first and second retaining elements 1108a, 1108b can each be secured to the frame 1102 by means of respective bolts 1116 and nuts 1118. Openings of the through-holes 1109a, 1109b in the first and second retaining elements 1108a, 1108b are countersunk and/or counterbored, so that the heads of the bolts 1116 may be recessed within the first and second retaining elements 1108a, 1108b.

When the first and second retaining elements 1108a, 1108b are secured to the frame 1102, their engagement surfaces 1110, 1112 engage the side surfaces 1128, 1130 and intermediate surfaces 1132, 1134 on either side of the seal element 1104, such that an upper surface of the seal element 1104 is held against a mounting surface 1106 of the frame 1102. Due to the slanting of the intermediate surfaces 1132, 1134, engagement of the engagement surfaces 1110, 1112 on the first and second retaining elements 1108a, 1108b with intermediate surfaces 1132, 1134 may cause the seal element 1104 to be pressed against the mounting surface 1106, such that it is securely held in place on the frame 1102. In other words, the first and second retaining elements 1108a, 1108b may act to clamp or wedge the seal element 1104 against the mounting surface 1106 of the frame 1102.

Each of the first and second retaining elements 1108a, 1108b has a respective upper surface 1120, 1122 which contacts the mounting surface 1106 of the frame 1102 when the first and second retaining elements 1108a, 1108b are secured to the frame 1102. However, the upper surface 1120, 1122 of each of the first and second retaining elements 1108a, 1108b is arranged to taper away from the mounting surface 1106 towards the seal element 1104, such that a gap is formed between the upper surface 1120, 1122 and the mounting surface 1106 near the seal element 1104. Tapering of the upper surfaces 1120, 1122 of the first and second retaining elements 1108a, 1108b in this manner may serve to ensure that the engagement surfaces 1110, 1112 firmly press against the sides of the seal element 1104.

Each of the first and second retaining elements 1108a, 1108b further has a respective lower surface 1124, 1126 which is arranged to contact the ground surface and slide along the ground surface. A height of the retaining elements 1108a, 1108b is similar to a height of the seal elements 1104, such that when the seal elements 1104 contact the ground surface, the retaining elements 1108a, 1108b may also contact the ground surface. The retaining elements 1108a, 1108b may be made of a different material compared to the seal elements 1104. For example, the retaining elements 1108a, 1108b may be made of a more lightweight and flexible material compared to the seal elements 1104, such as plastic, fibre glass or aluminium. As a result, the retaining elements 1108a, 1108b may be more prone to abrasion than the seal elements 1104, such that they may be worn down over time. As a result, the lower surfaces 1124, 1126 of the retaining elements 1108a, 1108b may be worn away, such that the retaining elements 1108a, 1108b no longer contact the ground surface when the seal elements 1104 contact the ground surface. Alternatively, the first and second retaining elements 1108a, 1108b may designed to have a smaller height compared to the seal elements 1104, so that they do not contact the ground surface when the seal elements 1104 contact the ground surface. This may reduce a wear on the first and second retaining elements 1108a, 1108b.

As shown in FIG. 11b, the set of first retaining elements 1108a and the set of second retaining elements 1108b are arranged such that they overlap a gap 1136 between adjacent seal elements 1104. In this manner, the first and second retaining elements 1108a, 1108b may act to block air flow through the gap 1136, thus reducing an air leakage through the sealing assembly 1100. In order to further reduce air leakage through the sealing assembly 1100, any gaps between the seal elements 1104, retaining elements 1108a, 1108b and the frame 1102 may be filled with a suitable filler material. The filler material may be highly flexible and easily deformable, so that it does not inhibit bending of the sealing assembly 1100. For example, silicone may be used as a filler material.

The configuration of sealing assembly 1100 may be beneficial in that it enables the bolts to be used for mounting the seal elements 1104 to the frame 1102 (which may typically be stronger and more reliable than an adhesive), without having to form through-holes directly in the seal elements 1104. Of course, in other embodiments, other types of mechanical fasteners may be used for securing the retaining elements 1108*a*, 1108*b* to the frame 1102.

Figures 12A, 12B:
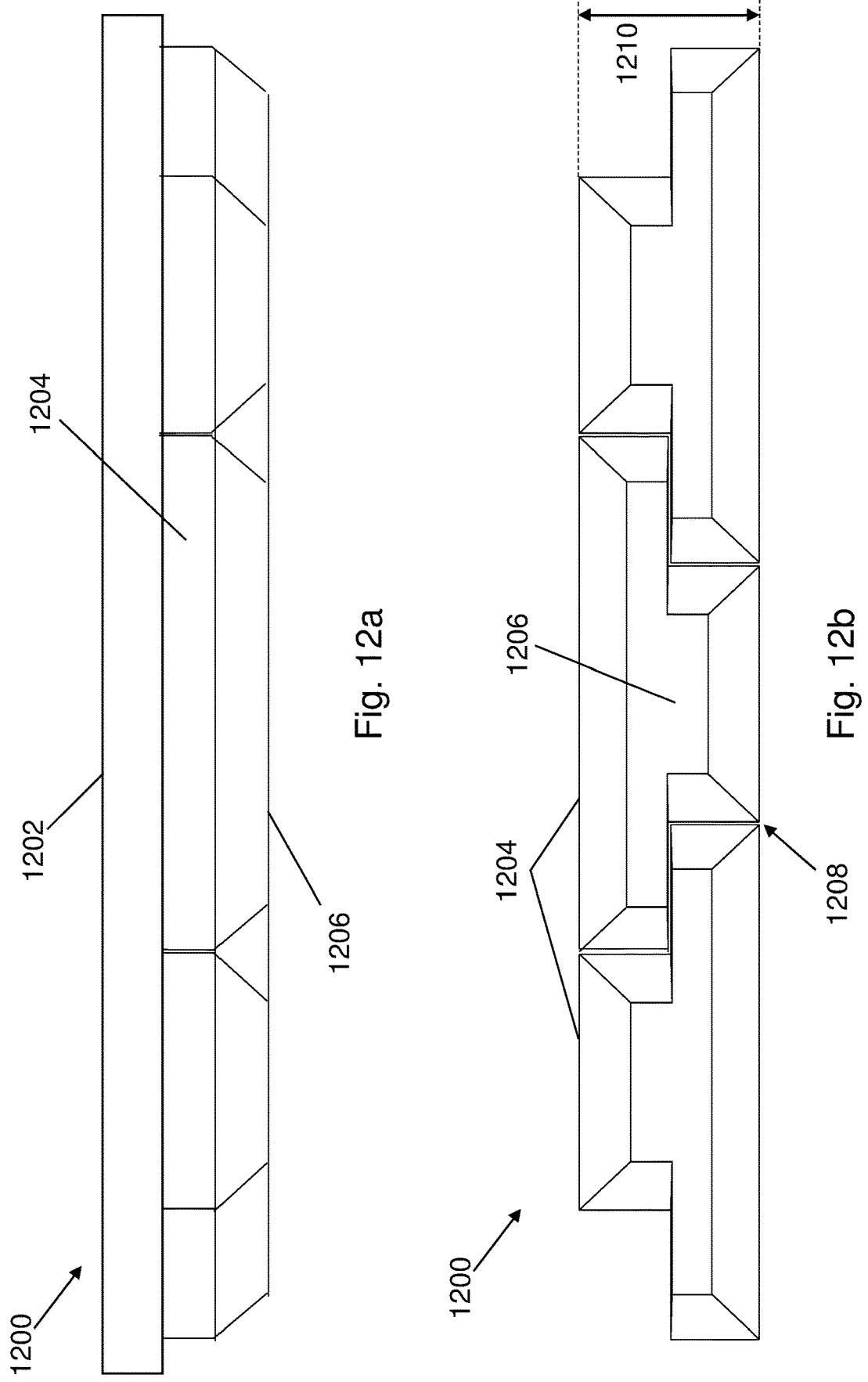
FIG. 12*a* is a schematic side view of a sealing assembly that is an embodiment of the invention.
FIG. 12*b* is a schematic plan view of an underside of the sealing assembly of FIG. 12*a;*

FIGS. 12*a* and 12*b* illustrate a sealing assembly 1200 according to an embodiment of the invention. FIG. 12*a* shows a schematic side view of the sealing assembly 1200, whilst FIG. 12*b* shows a schematic view of an underside of the sealing strip assembly. The sealing assembly 1200 may be used as part of a skirt in a downforce system of a vehicle. For example, the sealing assembly 1200 may correspond to the sealing assembly 102 discussed above in the context of the vehicle 100. The sealing assembly 1200 comprises a frame 1202, on which a plurality of seal elements 1204 are mounted adjacent to one another to form a sealing strip. FIGS. 12*a* and 12*b* depict only a portion of the sealing assembly 1200 where three seal elements are mounted next to each other on the frame 1202. However, in reality, the sealing assembly 1200 may extend beyond the portion illustrated in FIGS. 12*a* and 12*b*. For illustration purposes, the frame 1202 is not depicted in FIG. 12*b*. The materials discussed above in relation to the frame 118 and seal elements 136 of the sealing assembly 102 may be used for the frame 1202 and the seal elements 1204, respectively.

The seal elements 1204 each have a ground-engaging surface 1206 configured to contact the ground surface and slide along the ground surface. Edges of the ground-engaging surface 1206 of each seal element 1204 are chamfered, to avoid right-angle edges around the ground-engaging surface 1206. As shown in FIG. 12*b*, the seal elements 1204 have interlocking shapes, such that portions of adjacent seal elements 1204 overlap one another in a direction along the sealing strip (i.e. in a direction along which the seal elements 1204 are arranged adjacent to one another). In the example shown, each of the seal elements 1204 is shaped like the letter "T", with adjacent seal elements 1204 being rotated by 180° relative to one another such that their shapes interlock. However, any other overlapping or interlocking shapes of seal elements 1204 may be used.

Due to the interlocking arrangement of the seal elements 1204, a length of a gap 1208 between adjacent seal elements 1204 may be increased. In particular, the length of the gap 1208 may be greater than a width of the sealing strip. The width of the sealing strip is indicated by arrows 1210 in FIG. 12*b*. This may serve to restrict air flow though the gap 1208, and thus reduce air leakage through the sealing strip formed by the seal elements 1204.

Figures 13A, 13B:
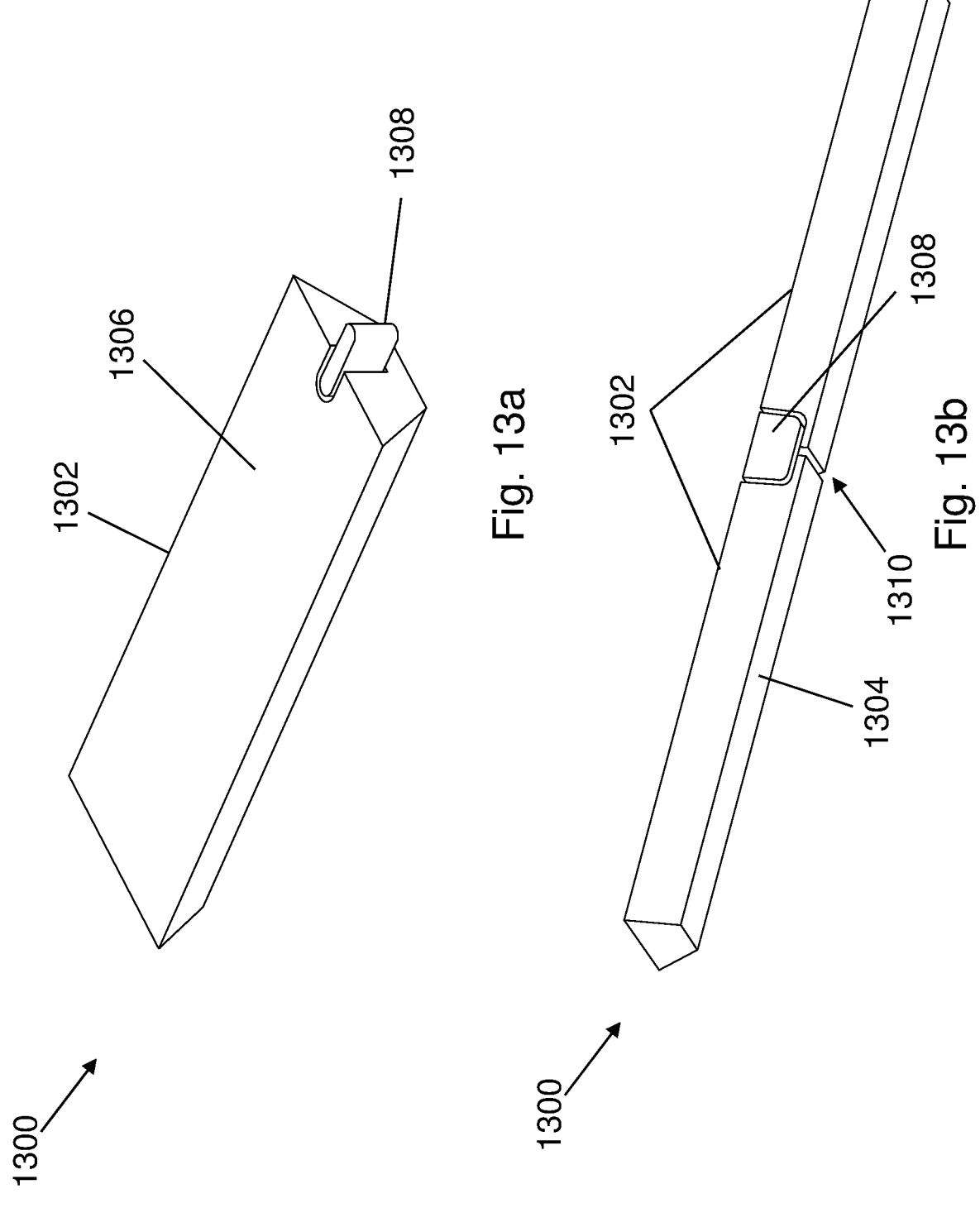
FIG. 13*a* is a schematic perspective view of part of a sealing assembly that is an embodiment of the invention.
FIG. 13*b* is a schematic cross-sectional view of part of the sealing assembly of FIG. 13*a;*

FIGS. 13*a* and 13*b* illustrate part of a sealing assembly 1300 according to an embodiment of the invention. The sealing assembly 1300 includes a plurality seal elements 1302 which are mounted adjacent to one another on a frame to form a sealing strip. For illustration purposes, the frame is not depicted in FIGS. 13*a* and 13*b*. FIG. 13*a* shows a schematic perspective view of one of the seal elements 1302, whilst FIG. 13*b* shows a schematic cross-sectional view of two adjacent seal elements 1302. The materials discussed above in relation to the frame 118 and seal elements 136 of the sealing assembly 102 may be used for the frame and the seal elements 1302 of the sealing assembly 1300, respectively.

Each seal element 1302 has a ground-engaging surface 1304 configured to contact the ground surface and slide along the ground surface, and an upper surface 1306 that is mounted against the frame (not shown). A blocking element 1308 extends between two adjacent seal elements 1302, such that it acts to restrict air flow between the adjacent seal elements 1302. In particular, as shown in FIG. 13*b*, the blocking element 1308 extends across a gap 1310 between the two adjacent seal elements 1302. As a result, air leakage between the seal elements 1302 may be reduced, thus improving a performance of the sealing assembly 1300. A similar blocking element may be provided between each pair of adjacent seal elements 1302 of the sealing assembly 1300.

In the example shown, the blocking element 1308 is formed by a piece of material having a first portion which is received in a first slot formed in the upper surface 1306 of a first one of the adjacent seal elements 1302, and a second portion which is received in a second slot formed in the upper surface 1306 of a second one of the adjacent seal elements 1302. Prior to mounting the seal elements 1302 on the frame, the blocking element 1308 may be placed in the slots in the seal elements 1302. Then, once the seal elements 1302 are mounted on the frame, the blocking element 1308 may be prevented from falling out of the slots by the frame. Of course, in other embodiments, other methods for providing a blocking element between the seal elements 1302 may be used. As shown in FIGS. 13*a* and 13*b*, the blocking element 1308 is slightly smaller than the slots in the seal elements 1302 in which it is received, such that small gaps may be formed between the blocking element 1308 and the seal elements 1302. As a result, the blocking element 1308 is not tightly held in the slots, such that an amount of movement of the blocking element 1308 within the slots is allowed. By allowing movement of the blocking element 1308 within the slots in the seal elements 1302, relative movement between the adjacent seal elements 1302 may be facilitated, as the blocking element 1308 may not significantly inhibit relative movement between the adjacent seal elements 1302. As an example, the blocking element 1308 may be made of aluminium. In some cases, the blocking element 1308 may be made of a material having a greater flexibility than each of the seal elements 1302, in order to facilitate relative movement between the seal elements 1302 when the frame bends.

Figures 14A, 14B:
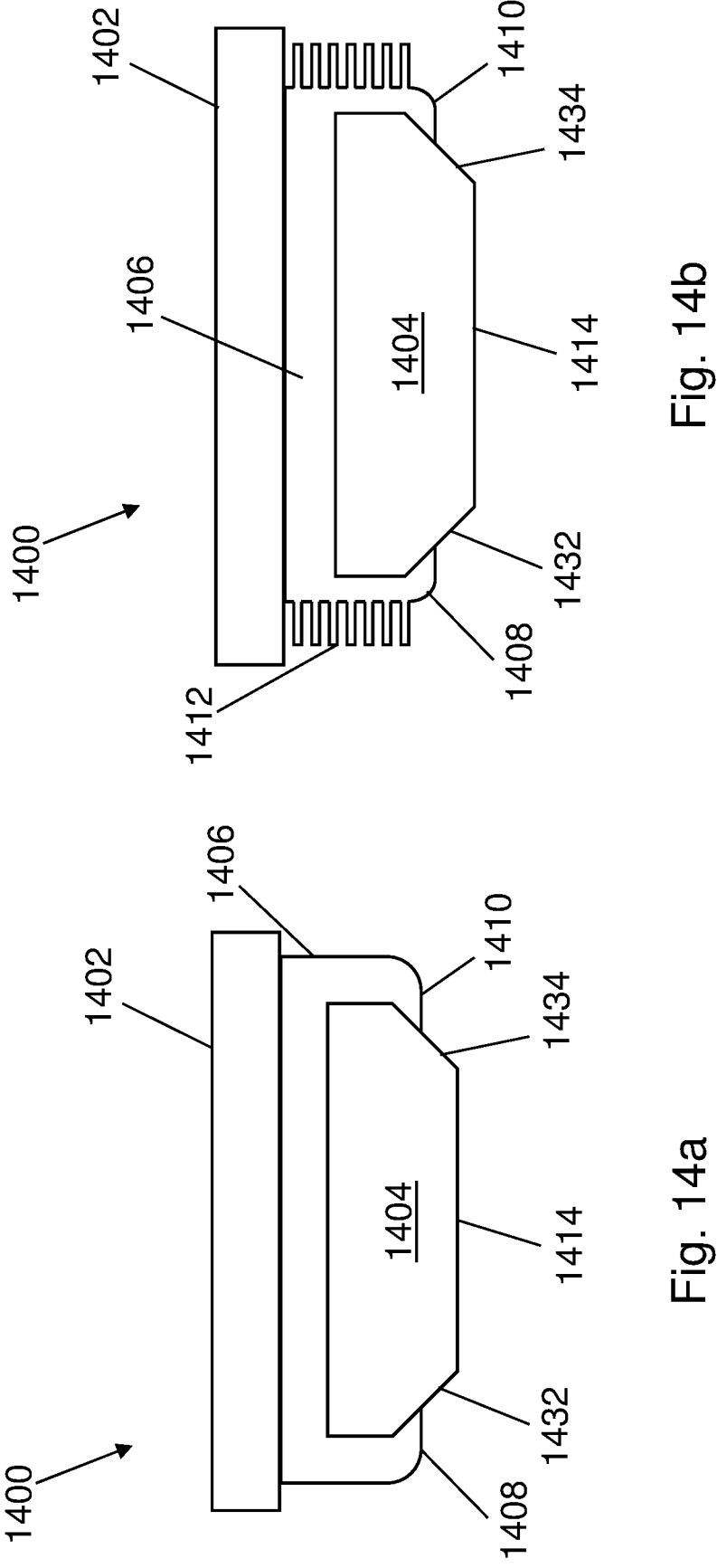
FIG. 14*a* is a schematic cross-sectional view of a sealing assembly according to an embodiment of the invention.
FIG. 14*b* is a schematic cross-sectional view of a sealing assembly according to an embodiment of the invention.

FIG. 14*a* shows a front cross-sectional view of a sealing assembly 1400 according to an embodiment of the invention. The sealing assembly 1400 may be used as part of a skirt in a downforce system of a vehicle. For example, the sealing assembly 1400 may correspond to the sealing assembly 102 discussed above in the context of the vehicle 100. The sealing assembly 1400 comprises a frame 1402, on which a plurality of seal elements 1404 are mounted adjacent to one another to form a sealing strip (only one seal element 1404 is visible in FIG. 14*a*). In a similar manner to that discussed above in relation to the sealing assembly 102, the frame 1402 has a greater flexibility than each of the seal elements 1404. The materials discussed above in relation to the frame 118 and seal elements 136 of the sealing assembly 102 may be used for the frame 1402 and the seal elements 1404, respectively.

The seal element 1404 shown in FIG. 14*a* is mounted to the frame 1402 via a holder element 1406. In the example shown, the holder element 1406 is bonded to the frame 1402 via an adhesive, however in other examples it may be secured to the frame via one or more fasteners (e.g. bolts or screws). The holder element 1406 defines a channel in which the seal element 1404 is received and held, the channel having a shape that is complementary to a shape of an outer surface of the seal element 1404, such that an interference fit is formed between the seal element 1404 and the holder element 1406. The seal element 1404 has a similar cross-sectional shape to the seal element 404 discussed above in relation to FIG. 5. In particular, the seal element 1404 includes a ground-engaging surface 1414 configured to contact the ground surface, and a pair of intermediate surfaces 1432, 1434 arranged on either side of the ground-engaging surface 1414, the intermediate surfaces 1432, 1434 being slanted relative to the ground-engaging surface 1414 (e.g. at an angle of around 45°).

The holder element 1406 comprises a first engagement portion 1408 which engages the intermediate surface 1432 of the seal element 1404, and a second engagement portion 1410 which engages the intermediate surface 1434 of the seal element 1404. Together, the first and second engagement portions 1408, 1410 define the channel in which the seal element 1404 is received. The first engagement portion 1408 is arranged to press against the intermediate surface 1432 of the seal element 1404, whilst the second engagement portion 1410 is arranged to press against the intermediate surface 1434, such that the seal element 1404 is held in place via frictional forces. The seal element 1404 may be installed by inserting the seal element 1404 into the channel in the holder element 1406. Likewise, the seal element 1404 may be removed from the sealing assembly 1400 by sliding it out of the channel in the holder element 1406. Thus, use of the holder element 1406 for mounting the seal element 1404 to the frame 1402 may facilitate installing and removing the seal element 1404.

Each of the plurality of seal elements 1404 of the sealing assembly 1400 may be held in a respective holder element 1406. Alternatively, multiple seal elements 1404 may be received within a single holder element 1406, e.g. the channel of a holder element 1406 may have a length adapted for receiving multiple seal elements 1404. The holder element 1406 may be made of any suitable material, e.g. such as a plastic or metallic material.

FIG. 14*b* depicts a variation of the sealing assembly 1400, where the holder element 1406 further comprises a heat dissipation structure in the form of fins 1412 formed on an outer surface of the holder element 1406. The fins 1412 protrude laterally outwards from sides of the holder element 1406, i.e. they protrude outwards from the sides of the first engagement portion 1408 and the second engagement portion 1410. The fins 1412 act to increase a surface are of the holder element 1406, in order to facilitate heat dissipation. In particular, the fins 1412 are oriented substantially parallel to the ground-engaging surface 1414 of the seal element 1404, and extend in a longitudinal direction such that air may flow over the fins 1412 when a vehicle comprising the sealing assembly 1400 is moving. The presence of a heat dissipation structure on the holder element 1406 may enable heat from the seal element 1404 to be effectively dissipated via the holder element 1406, which may improve a performance and durability of the seal element 1404. In the example of FIG. 14*b*, the holder element 1406 may be made of a metallic material (e.g. aluminium or steel), in order to facilitate heat transfer from the seal element 1404 to the holder element 1406, thus promoting heat dissipation via the fins 1412.

Various methods for securing seal elements to a frame for making a sealing assembly according to the invention have been discussed above. It should be noted that, in some embodiments of the sealing assembly, different seal elements may be mounted on the frame using different methods, i.e. not all of the seal elements need necessarily be mounted on the frame in the same manner. Accordingly, some embodiments may include various combinations of the methods described above for mounting the seal elements on the frame.

The invention claimed is:

1. A sealing assembly for forming an at least partial seal with a ground surface under a vehicle, the sealing assembly comprising:
 a frame; and
 a plurality of seal elements mounted adjacent to one another on the frame to form a sealing strip, wherein each of the plurality of seal elements is arranged to contact the ground surface and slide along the ground surface;
 wherein the frame has a greater flexibility in a direction normal to the ground surface compared to each of the plurality of seal elements, such that the frame is more easily bendable in the direction normal to the ground surface compared to each of the plurality of seal elements.

2. A sealing assembly according to claim 1, wherein the plurality of seal elements is arranged such that a gap is formed between at least one pair of adjacent seal elements.

3. A sealing assembly according to claim 2, wherein the gap is filled with a material having a higher flexibility than a material of the plurality of seal elements.

4. A sealing assembly according to claim 1, wherein at least one of the plurality of seal elements comprises a ground-engaging surface configured to contact the ground surface, and wherein one or more edges of the ground-engaging surface are rounded, chamfered or bevelled.

5. A sealing assembly according to claim 1, wherein the frame comprises a material having a greater flexibility than a material of the plurality of seal elements.

6. A sealing assembly according to claim 1, wherein one or more of the plurality of seal elements is bonded to the frame via an adhesive.

7. A sealing assembly according to claim 1, wherein one or more of the plurality of seal elements is removably mounted to the frame.

8. A sealing assembly according to claim 7, wherein each of the one or more of the plurality of seal elements is removably mounted to the frame by a respective fastener that is received in a hole in the seal element.

9. A sealing assembly according to claim 8, wherein the hole is countersunk or counterbored, such that a head of the fastener is recessed into the seal element.

10. A sealing assembly according to claim 7, further comprising one or more retaining elements for removably mounting the one or more of the plurality of seal elements to the frame, wherein each retaining element is releasably engageable with a surface of a seal element to hold the seal element against the frame.

11. A sealing assembly according to claim 10, wherein each of the one or more retaining elements is removably mounted to the frame.

12. A sealing assembly according to claim 10, wherein each of the one or more retaining elements is arranged to engage respective surfaces on two or more adjacent seal elements.

13. A sealing assembly according to claim 10, wherein the one or more retaining elements comprise a first set of retaining elements and a second set of retaining elements which are arranged to engage surfaces on opposite sides of the one or more of the plurality of seal elements, such that the one or more of the plurality of seal elements are held between the first set of retaining elements and the second set of retaining elements.

14. A sealing assembly according to claim 10, wherein the one or more retaining elements are made of a different material compared to the plurality of seal elements.

15. A sealing assembly for forming an at least partial seal with a ground surface under a vehicle, the sealing assembly comprising:
a frame;
a plurality of seal elements mounted adjacent to one another on the frame to form a sealing strip, wherein each of the plurality of seal elements is arranged to contact the ground surface and slide along the ground surface; and
one or more holder elements for removably mounting the one or more of the plurality of seal elements to the frame, wherein each holder element is mounted to the frame and defines a channel in which at least one of plurality of seal elements is received, the holder element being configured to engage an outer surface of the seal element to hold the seal element in the channel;
wherein the frame has a greater flexibility compared to each of the plurality of seal elements.

16. A sealing assembly according to claim 7, further comprising an intermediate material disposed between the frame and each of the one or more of the plurality of seal elements, wherein the intermediate material is removably mounted to the frame and the one or more of the plurality of seal elements are secured to the intermediate material.

17. A sealing assembly according to claim 16, wherein the intermediate material comprises a plurality of respective intermediate elements disposed between the frame and each one or more of the plurality of seal elements.

18. A sealing assembly according to claim 16, wherein the one or more of the plurality of seal elements are secured to the intermediate material via an adhesive.

19. A sealing assembly according to claim 16, wherein one or more voids or cavities are formed in the intermediate material.

20. A sealing assembly according to claim 16, wherein a surface of the intermediate material to which the one or more of the plurality of seal elements are secured comprises one or more engagement features which are engaged with corresponding engagement features on the one or more of the plurality of seal elements.

21. A sealing assembly according to claim 1, wherein the plurality of seal elements comprise a ceramic material, a composite ceramic material, and/or a carbide material.

22. A sealing assembly according to claim 1, wherein the plurality of seal elements comprises one or more seal elements having a substantially rectangular cross-section in a plane parallel to the ground surface.

23. A sealing assembly according to claim 1, wherein at least one of the plurality of seal elements comprises a portion that overlaps a corresponding portion of an adjacent seal element.

24. A sealing assembly according to claim 1, further comprising a blocking element extending between a first one of the plurality of seal elements and a second, adjacent, one of the plurality of seal elements, the blocking element being arranged to restrict an air flow between the first and second ones of the plurality of seal elements.

25. A sealing assembly according to claim 1, wherein the plurality of seal elements comprises one or more seal elements, each one having an inner side arranged to face towards an inside of the at least partial seal with the ground surface, and an outer side arranged to face towards an outside of the at least partial seal with the ground surface, and wherein the inner side of the seal element is shorter than the outer side of the seal element.

26. A sealing assembly according to claim 1, wherein:
the plurality of seal elements comprises a first seal element arranged at a front end of the sealing strip, the first seal element comprising a pointed or curved tip facing in a forward direction of the sealing strip; and/or
wherein the plurality of seal elements comprises a second seal element arranged at a rear end of the sealing strip, the second seal element comprising a pointed or curved tip facing a rearwards direction of the sealing strip.

27. A sealing assembly according to claim 1, wherein the sealing strip forms a closed shape.

28. A sealing assembly according to claim 1, wherein the sealing assembly further comprises an outer sealing strip which is mounted on the frame, the outer sealing strip being arranged on an outer side of the sealing strip formed by the plurality of seal elements.

29. A skirt for a downforce system of a vehicle, the skirt comprising:
a divider connected at an upper end to an upper surface of the skirt, the divider being arranged to extend downwards from the upper surface to thereby define at least in part a region over a ground surface on which the vehicle is disposed; and
a sealing assembly according to claim 1, wherein the frame extends along a lower end of the divider such that the sealing strip is arranged to form an at least partial seal with the ground surface.

30. A skirt according to claim 29, wherein the frame is movable relative to the upper surface between a deployed position where the plurality of seal elements are arranged to contact the ground surface, and a stowed position where the plurality of seal elements are spaced apart from the ground surface.

31. A skirt according to claim 29, wherein the skirt is configured to apply a force to the frame to press the sealing strip against the ground surface.

\* \* \* \* \*